United States Patent
Akrapovic et al.

(10) Patent No.: US 10,605,133 B2
(45) Date of Patent: Mar. 31, 2020

(54) EXHAUST SYSTEM FOR AN INTERNAL COMBUSTION AUTOMOTIVE ENGINE

(71) Applicant: AKRAPOVIC D.D., Ivancna Gorica (SI)

(72) Inventors: Igor Akrapovic, Ljubljana (SI); Jaka Klemenc, Ljubljana (SI); Gašper Sedej, Idrija (SI); Simon Vipavec, Crnomelj (SI)

(73) Assignee: AKRAPOVIC D.D., Ivancna Gorica (SI)

( * ) Notice: Subject to any disclaimer, the term of this patent is extended or adjusted under 35 U.S.C. 154(b) by 87 days.

(21) Appl. No.: 15/759,198

(22) PCT Filed: Aug. 10, 2016

(86) PCT No.: PCT/EP2016/069039
§ 371 (c)(1),
(2) Date: Mar. 9, 2018

(87) PCT Pub. No.: WO2017/041980
PCT Pub. Date: Mar. 16, 2017

(65) Prior Publication Data
US 2018/0252131 A1    Sep. 6, 2018

(30) Foreign Application Priority Data

Sep. 10, 2015  (EP) .................................... 15002654

(51) Int. Cl.
*F01N 13/04* (2010.01)
*F01N 1/16* (2006.01)
(Continued)

(52) U.S. Cl.
CPC ............. *F01N 1/163* (2013.01); *F01N 1/166* (2013.01); *F01N 1/168* (2013.01); *F01N 3/00* (2013.01);
(Continued)

(58) Field of Classification Search
CPC . F01N 1/163; F01N 1/166; F01N 1/18; F01N 13/087; F01N 2410/10
See application file for complete search history.

(56) References Cited

U.S. PATENT DOCUMENTS 7,703,574 B2    4/2010  Krueger et al.
2011/0000201 A1*  1/2011  Laube ..................... F01N 1/166
                                                    60/324
(Continued)

FOREIGN PATENT DOCUMENTS

DE    10 2010 003 301 A1    5/2011
EP    2 000 643 A1    12/2008
(Continued)

OTHER PUBLICATIONS

Machine translation of DE102010003301A1, accessed Aug. 2, 2019. (Year: 2019).*
(Continued)

*Primary Examiner* — Jonathan R Matthias
(74) *Attorney, Agent, or Firm* — BakerHostetler LLP

(57) ABSTRACT

An exhaust system for an internal combustion automotive engine, such as a V engine or boxer engine, includes a left exhaust tract connectable to a left group of cylinders and a right exhaust tract connectable to a right group of cylinders. Each exhaust tract includes a tract structure defining a tract inlet for receiving exhaust gas ejected from the group of cylinders to which the exhaust tract is connectable, at least one exhaust outlet opening into the atmosphere, and a connection pipe extending between the tract inlet and the exhaust outlet. The connection pipe includes an inlet aperture for receiving exhaust gas from the tract inlet and an outlet aperture for transferring exhaust gas towards the exhaust opening. The left and the right connection pipes are joined to realize a pipe junction such that the connection pipes form a common connection aperture for transferring (Continued)

exhaust gas and the exhaust system includes at least one valve member for opening or closing the common connection aperture.

17 Claims, 10 Drawing Sheets

(51) Int. Cl.
*F01N 13/08* (2010.01)
*F01N 3/00* (2006.01)
*F01N 9/00* (2006.01)

(52) U.S. Cl.
CPC ............... *F01N 9/00* (2013.01); *F01N 13/04* (2013.01); *F01N 13/087* (2013.01); F01N 2240/20 (2013.01); F01N 2240/36 (2013.01); F01N 2260/14 (2013.01); F01N 2260/16 (2013.01); F01N 2410/10 (2013.01); F01N 2470/14 (2013.01); Y02T 10/20 (2013.01); Y02T 10/47 (2013.01)

(56) References Cited

U.S. PATENT DOCUMENTS

| | | |
|---|---|---|
| 2013/0008737 A1 | 1/2013 | Mueller et al. |
| 2014/0166394 A1 | 6/2014 | Winkel |
| 2018/0016954 A1* | 1/2018 | Eichmueller ........... F01N 1/003 |

FOREIGN PATENT DOCUMENTS

| | | |
|---|---|---|
| EP | 2 287 452 A1 | 2/2011 |
| JP | 57-159919 A | 10/1982 |
| JP | 4-121407 A | 4/1992 |
| JP | 2007-218174 A | 8/2007 |

OTHER PUBLICATIONS

International Preliminary Report on Patentability and Written Opinion issued in Application No. PCT/EP2016/069039, dated Mar. 22, 2018.

* cited by examiner

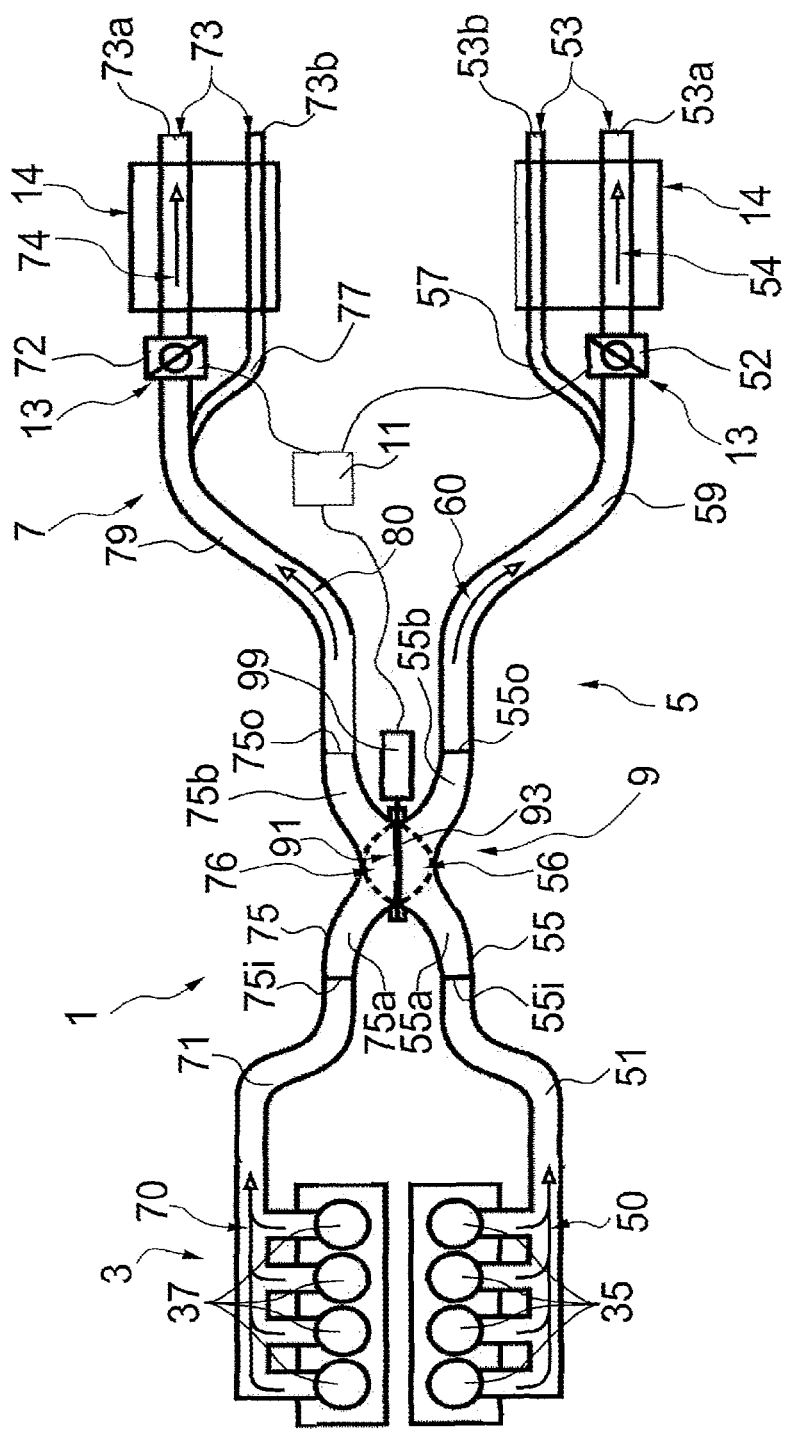

EXHAUST SYSTEM FOR AN INTERNAL COMBUSTION AUTOMOTIVE ENGINE

CROSS-REFERENCE TO RELATED APPLICATIONS

This application is a National Stage of International Patent App No. PCT/EP2016/069039, filed Aug. 10, 2016, which claims priority to European Patent Application No. EP 15 002 654.0, filed Sep. 10, 2015, the disclosures of which are incorporated by reference in their entirety.

FIELD OF THE INVENTION AND BACKGROUND

The invention relates to an exhaust system for an internal combustion automotive engine, such as V-engine or a boxer engine. Typical high performance internal combustion automotive engines have a left group of cylinders and a right group of cylinders, each of which is connectable to an individual left or right exhaust tract. In such an exhaust system each exhaust tract, the left exhaust tract and the right exhaust tract, comprises a tract structure which defines a tract inlet into which the exhaust gas is injected from the respective left or right group of cylinders and one or more exhaust outlets opening into the atmosphere for releasing exhaust gas from the exhaust system.

Each exhaust tract of such an exhaust system can run from its group of cylinders towards its exhaust outlet without any connection to the other tract. In such a setup the exhaust gas from a left group of cylinders is transported exclusively through the left exhaust tract and exclusively to a left exhaust opening. At the same time, exhaust gas from the right group of cylinders is transported through the right exhaust tract towards the right exhaust outlet, exclusively. No exhaust gas from one tract is in such a system delivered into the other tract. However, for improving performance and in order to be able to improve control over the system's sound emission, known exhaust systems have been provided with one or more exhaust transmission pipes which connect the left exhaust tract to the right exhaust tract. The exhaust gas transmission pipes are arranged in exhaust systems such that they connect the left exhaust tract to the right exhaust tract in an H-shaped manner and can be provided with a valve in order to be able to open and/or close the exhaust gas transmission through the exhaust gas transmission pipe.

A typical design for such an exhaust outlet is known from U.S. Pat. No. 7,703,574 B2 in which the left exhaust tract is connected to the right exhaust tract with two transmission pipes so that two H-shaped transmissions are realized, one of which is arranged relatively close to the engine and the other one of which is arranged closer to the exhaust openings.

Known exhaust systems allow for some control over the exhaust system's acoustics and may improve performance in specific operating states of the engine. However, particularly at high engine operating parameters, they suffer from significant disadvantages with respect to both sound emission and performance. At high engine operation parameters, the above-mentioned exhaust systems emit a disturbing streaming noise. Furthermore, the the transmission pipe induces turbulences into the exhaust gas streams in both the left and the right exhaust tract which limit the performance of the engine and muffling devices. The performance gain is particularly limited by the amount of exhaust gas which may be transferred from one line to the other line being smaller than desired.

SUMMARY OF THE INVENTION

It is an object of the invention to overcome disadvantages of the prior art, particularly to provide an improved exhaust system for an internal combustion automotive engine, particularly to provide an exhaust system which is improved regarding sound emission control while simultaneously being able to improve engine performance.

This object is solved by the features of the independent claims.

According to a first aspect of the invention, the exhaust system for an internal combustion automotive engine, such as a V6-engine, a V8-engine, another V-engine, a boxer engine, or the like, comprises a left exhaust tract connectable to a left group of cylinders of the internal combustion automotive engine and it comprises a right exhaust tract connectable to a right group of cylinders of the internal combustion automotive engine. Each exhaust tract comprises a tract structure defining a tract inlet for receiving exhaust gas ejected from the group of cylinders to which the tract is connectable, at least one exhaust outlet opening into the atmosphere, and a connection pipe extending between the tract inlet and the exhaust outlet. The connection pipe includes an inlet aperture for receiving exhaust gas from the tract inlet and an outlet aperture for transferring exhaust gas towards the exhaust opening or for exchanging exhaust gas between the tracts.

The left exhaust tract comprises a left tract structure which defines a left tract inlet for receiving exhaust gas ejected from the left group of cylinders to which the left exhaust tract is connectable, at least one left exhaust outlet opening into the atmosphere, and a left connection pipe extending between the left tract inlet and the left exhaust outlet. Further, said left connection pipe includes a left inlet aperture for receiving exhaust gas from the left tract inlet and a left outlet aperture for transferring exhaust gas towards the left exhaust opening. The right exhaust tract comprises a right tract structure defining a right tract inlet for receiving exhaust gas ejected from the right group of cylinders to which the right tract is connectable, at least one right exhaust outlet opening into the atmosphere, and a right connection pipe extending between the right tract inlet and the right exhaust outlet. The right connection pipe includes a right inlet aperture for receiving exhaust gas from the right tract inlet and a right outlet aperture for transferring exhaust gas towards the right exhaust opening. Each exhaust tract thus comprises two individual tract structures. Preferably, the exhaust outlets of the left tract and the exhaust outlets of the right tract are not the same. Particularly, the connection pipe of the left exhaust tract and the connection pipe of the right exhaust tract are not the same.

In the first aspect of the invention, the left connection pipe and the right connection pipe are joined to realize a pipe junction such that the connection pipes form a common connection aperture for transferring exhaust gas between the tracts. The left connection pipe's connection aperture is preferably immediately joined to the right pipe's connection aperture to realize a common connection aperture. In particular, each connection pipe defines a respective circumferential pipe surface in which a respective pipe aperture is formed so that the left connection pipe and the right connection pipe can be joined such that their connection pipe apertures are aligned with one another. Such connection pipe apertures are preferably of the same size. The exhaust gas is preferably able to transfer directly between the tracts through the pipe junction. In particular, exhaust gas from a left group of cylinders can be transferred from the left connection pipe through the common connection aperture into the right connection pipe which belongs to the right exhaust tract. Vice versa, exhaust gas from the right group of cylinders can be transferred from the right connection pipe through the common connection aperture into the left connection pipe. Due to such an immediate connection via the pipe junction, a transfer pipe between the left tract and the right tract is avoided and thus the dead volume of a transfer pipe is not generated in an exhaust system according to the invention. It has been shown that the direct transfer from exhaust gas between the tracts improves the amount of exhaust gas which is transferred from one tract to the other tract during typical operating parameters of an engine with respect to a common exhaust gas system having H-shaped transmission. Furthermore, it has surprisingly been shown that, in the exhaust system according to the invention, in which exhaust gas is transferred directly between the tracts through the common connection aperture, acoustic drawbacks, particularly streaming noise, at high operational parameters of the engine can be significantly reduced.

In the first aspect of the invention, the exhaust system comprises at least one valve member for opening and/or closing the common connection aperture. Preferably the valve member can be controlled to selectively open or close the common connection aperture. The common connection aperture can be opened, partially opened, partially closed, and/or fully closed by a valve member, such that the transfer or exchange of exhaust gas between the tracts can advantageously be controlled in order to improve performance and/or in order to control and preferably decrease sound emission. Preferably the exhaust system comprises exactly one valve member.

An exhaust outlet is preferably a direct opening into the atmosphere but could also be an indirect opening into the atmosphere, if between the atmosphere and the exhaust outlet an exhaust gas manipulating device, such as a muffler or catalyzer, is arranged.

Preferably, the size and/or geometry of the respective cross sectional area of the right and/or left connection pipe is essentially constant. In particular, the size and/or geometry of the respective cross sectional area of the right and/or left connection pipe at the common connection aperture and perpendicular to the common connection aperture is approximately as large as at the pipe's inlet aperture and/or outlet aperture.

In a preferred embodiment of the invention, the connection pipes are bent, preferably in a mirror-symmetrical manner, in particular angled and/or curved. In particular, the connection pipes are bent such that the pipe junction is essentially X-shaped. The dead volume of a X-shaped pipe junction with respect to exhaust gas being transferred between a left tract and a right tract can be reduced to a minimum.

Preferably, an upstream pipe arm and a downstream pipe leg of one connection pipe, the left connection pipe or the right connection pipe, can be formed to realize a V-shaped or U-shaped (left or right) connection pipe. Such a deformation can preferably be applied to both the left and the right connection pipe. The connection pipes which realize the pipe junction can preferably be deformed such that the upstream pipe arms of the connection pipe realize a V-shape and/or such that the downstream pipe legs of the connection pipes are formed to a V-shape. Preferably, an upstream left pipe arm is arranged coaxially with respect to a downstream right pipe leg and/or the upstream pipe arm of the right connection pipe is arranged coaxially with respect to the downstream pipe leg of the left connection pipe. The terms "upstream" and "downstream" are used with respect to the exhaust gas flow path from the engine to the exhaust outlet.

The pipe junction is particularly designed such that pulsatile flow of exhaust gas coming from one inlet aperture of a respective left or right exhaust tract impacts with a pulsatile flow of exhaust gas coming from the other inlet aperture within the pipe junction, preferably at its mixing area, such that the first mentioned pulsatile flow urges the other one out of the second mentioned inlet aperture and towards the outlet aperture of the same tract side and also towards the outlet aperture on the tract side of the second inlet aperture. Accordingly, a pulsatile exhaust gas flow arriving at the right inlet aperture of the pipe junction may help exhaust gas to be drawn from the left tract inlet to exit through the left removal pipe, and vice versa. The pipe junction is designed to use energy of preferably pulses from one (left or right) exhaust tract to accelerate exhaust gas coming from the opposite (right or left) exhaust tract. This function may be called push-pull effect. It turned out that the push-pull effect substantially increases the engine performance.

In an embodiment of the exhaust system according to the invention, the pipe junction realizes the only connection for transferring exhaust gas between the tracts. Providing one exclusive pipe junction with the pipe aperture for transferring exhaust gas from the left exhaust tract to the right exhaust tract, and vice versa, allows for controlling the exhaust gas stream through the tract in a very simple yet efficient manner. Simultaneously, negative interferences, which may occur when using multiple connections between the tracts, can be avoided. It shall be clear that any connections which transfer gas upstream from the cylinders do not connect the exhaust gas tracts as exhaust gas is only generated in the combustion within the cylinders. Furthermore, as the exhaust gas tracts terminate in the exhaust outlets opening into the atmosphere, the atmosphere is not to be considered as being part of an exhaust gas tract.

In a further preferred embodiment of the exhaust system according to the invention, which can be combined with any one of the above-mentioned preferred embodiments, the common connection aperture defines a mixing area which is between 0.25 times and 4 times, preferably between 0.5 times and 2 times as large as, preferably between 0.75 times and 1.5 times as large as, in particular of the same size as, a reference area defined by the cross-sectional area of a section or sections of the left and/or right exhaust tract, preferably a reference area defined by the left and/or right connection part thereof. The reference area is in particular defined at the respective inlet aperture or outlet aperture of the left or right connection pipe, or defined by the mean value of a cross-sectional area of the left or right connection pipe, either in the path from the inlet aperture to the outlet aperture, the mean value of both respective inlet aperture cross-sectional areas and/or their outlet apertures' cross-sectional areas. The reference area can also be defined by the summed area of both of the connection pipes cross-sections perpendicular to the center of the common connection aperture. Good sound transmission properties have for example been achieved with pipe junctions that have mixing areas which are of the same size or larger than the area of the sum of both connection pipes' cross-sections perpendicular to the center of the common connection aperture.

According to another embodiment of the invention the at least one valve member includes a closure member, such as a flap, a slide, or the like, for covering at least 50%, preferably at least 75%, in particular at least 90%, most preferably the entirety of a mixing area defined by the common connection aperture. In particular the closure member comprises a bypass aperture. The closure member can preferably be rotated, particularly for 90%, to switch between a fully opened and preferably fully closed state.

A further preferred embodiment of an exhaust system according to the invention comprises at least one valve device for inhibiting the flow path of exhaust gas, in particular for partially inhibiting the flow path and/or for fully inhibiting the flow path of exhaust gas, within the left exhaust tract and/or within the right exhaust tract, at a respective exhaust tract aperture between the inlet aperture and at least one, in particular exactly one, outlet aperture. Preferably the left exhaust system comprises a left valve device and the right exhaust system comprises a right valve device, wherein the left valve device and the right valve device are structurally separate from one another and/or controllable, preferably controlled, independently of one another. According to another further development of this embodiment, the exhaust system comprises exactly one valve device for inhibiting the flow path of exhaust gas through both the left exhaust tract and the right exhaust tract, wherein in particular the valve device is realized as part of the pipe junction.

In a further development of the invention, each exhaust tract further comprises at least one bypass pipe, preferably exactly one bypass pipe, leading to a second exhaust outlet opening into the atmosphere. The second exhaust outlet can be called a bypass exhaust outlet and the other, first exhaust outlet can be called the main exhaust outlet. Preferably a main exhaust outlet is larger than a bypass exhaust outlet, in particular at least 1.1 times, 1.2 times, 1.5 times, 1.75 times, 2 times, 3 times, 4 times, 5 times as large as the bypass exhaust outlet with respect to the outlet areas thereof.

The bypass line is in particular branched off upstream from the valve device and in particular upstream from the pipe junction. For providing a bypass pipe which branches off upstream from the valve device and/or the pipe junction, exhaust gas can be forced into the bypass pipe by closing the valve device and/or the pipe junction in order to decrease the exhaust system's sound emission.

In a preferred further development of the invention, the valve device is included in the pipe junction, wherein the junction includes a first valve member and a second valve member. The first and second valve members are in particular movable independently from one another. Preferably the first and second valve members are movable dependently from one another due to a mechanical connection and/or due to the control unit being adapted to control the valve members dependent from one another. If the valve members are only movable in a manner dependent from one another, the control is simplified and the risk of control errors may be decreased. An independent control of the valve members on the other hand allows for a large degree of freedom for controlling the exhaust gas stream through the exhaust system.

In a preferred further development of the invention the first valve member is a left valve member movable for selectively opening the common connection aperture and/or the left exhaust tract aperture. In this further development, the second valve member is a right valve member movable for selectively opening the common connection aperture and/or the right exhaust tract aperture.

In another further development, the first valve member is realized by a central valve member for selectively opening or closing the common connection aperture. In this further development the second valve member is realized by a common valve member for opening and closing both tract apertures.

In another preferred embodiment of the invention in which the pipe junction comprises a first valve member and a second valve member, the first valve member and the second valve member are rotationally movable, wherein preferably both valve members are rotationally movable around the same axis of rotation or in which the first valve member is rotationally movable around a first axis of rotation and wherein the second valve member is rotationally movable around a second axis of rotation, wherein the first axis of rotation is essentially parallel to the second axis of rotation. Preferably, the first valve member and/or the second valve member comprise an excentric closure member such as a wall, which excentric closure member is excentric with respect to the respective valve member's axis of rotation. The distance between two parallel axis of rotation, the first axis of rotation and the second axis of rotation, can approximately, be twice the distance of the radial offset of a closure member.

According to a second aspect of the invention, an exhaust system for an internal combustion automotive engine, such as a V-engine or a boxer engine, comprises a left exhaust tract connectable to a left group of cylinders of the internal combustion automotive engine and a right exhaust tract connectable to a right group of cylinders of the internal combustion automotive engine. In this second aspect according to the invention, each exhaust tract comprises a tract structure defining a tract inlet for receiving exhaust gas ejected from the group of cylinders to which the exhaust tract is connectable and at least two exhaust outlets, particularly a main exhaust outlet and a bypass exhaust outlet, opening into the atmosphere.

According to this second aspect of the invention, each exhaust tract further comprises a valve device for opening and/or closing a tract aperture arranged between the tract inlet and one of the at least two exhaust outlets, such that in the open state of the valve device, exhaust gas is transferable from the tract inlet to all of the at least two exhaust outlets, and such that in the closed state of the valve device, exhaust gas is prevented from flowing from the tract inlet to preferably exactly one of the at least two, preferably exactly two, exhaust outlets, particularly the main exhaust outlet. Each exhaust tract further comprises at least one connection, in particular a common connection aperture, for transferring exhaust gas between the tracts. The exhaust system according to this second aspect of the invention comprises at least one valve member, preferably exactly one or two valve members, for selectively opening or closing the at least one connection.

The exhaust system in this second aspect of the invention thus has a left exhaust tract comprising a tract structure which defines a left tract inlet, at least two left exhaust outlets, particularly a left main exhaust outlet and a left bypass exhaust outlet, a left valve device for opening and/or closing a left tract aperture arranged between the left tract inlet and one of the at least two left exhaust outlets, such that the left valve device can allow or prohibit exhaust gas to be transferred from the left tract inlet to at least one of the at least two left exhaust outlets. This left exhaust tract further comprises at least one connection, which may be realized by a common connection aperture of the left and the right exhaust tracts, for transferring exhaust gas from the left tract to the right tract. A valve member can be provided for selectively opening or closing the at least one connection. The right exhaust tract comprises a right tract structure defining a right tract inlet, at least two right exhaust outlets, and a right valve device, which provide the same function in the right tract as provided by the corresponding left components in the left tract. The left exhaust tract has two left exhaust openings which are preferably different from the two right exhaust openings of the right exhaust tract. The exhaust system thus preferably has at least four exhaust outlets in total. The right exhaust tract further comprises at least one connection for transferring exhaust gas from the right tract to the left tract which connection is preferably realized by a common connection aperture. The exhaust system comprises at least one valve member for opening and/or closing the connection. The exhaust system can in particular include a first valve member and a second valve member which can act in the manner of the first and second valve members described above with respect to the first aspect of the invention. In the second aspect of the invention it is particularly advantageous that the exhaust gas flow through the exhaust system can be controlled via the valve device(s) and the valve member in a very precise way in order to be able to optimally improve performance and/or sound emission.

With respect to this second aspect of the invention either one of the left and right tract shall comprise a valve device. In this way, the exhaust gas flow through the left main exhaust outlet is controlled dominantly by the left valve device whereas the exhaust gas flow through the right main exhaust outlet is dominantly influenced by the right valve device. Although it is possible to include the left valve device and the right valve device in one functional unit, for example by including a common valve member as described with respect to one of the further developments mentioned above, it is preferred that one respective individual left or right valve device is arranged in the respective left or right exhaust tract.

Preferably, each of the at least four exhaust outlets opens into the atmosphere wherein each exhaust outlet is separate from all of the other exhaust outlets. Exhaust outlets can for example be arranged next to one another, coaxial to one another with an annular outlet area, in a honeycomb-like-fashion, or the like.

In a preferred embodiment of the second aspect of the invention, the cross-sectional area or outlet area in the main exhaust outlet is larger than, preferably at least approximately 1.1 times, 1.25 times, 1.3 times, 1.5 times, 2.0 times, 2.5 times, 3.0 times, 4.0 times or more times as large as the cross-sectional area or outlet area of the bypass exhaust outlets.

Another preferred embodiment of the exhaust system according to the second aspect of the invention includes a valve device which is arranged in the respective left or right exhaust tract downstream with respect to the connection. The connection is preferably realized by a common connection aperture.

In another preferred embodiment of the invention, each exhaust tract further comprises a bypass line for transferring exhaust gas from the tract inlet to one of the at least two openings, preferably to the bypass exhaust opening.

In a further development of the invention, the bypass line is split-off from the main piping from the respective exhaust tract, which main piping includes the respective tract inlet and at least one other of the at least two exhaust openings, preferably the main exhaust opening, either upstream or downstream of the connection, preferably of a connection pipe of the respective exhaust tract which connection pipe includes a connection aperture.

A preferred embodiment of the exhaust system according to the first and/or second aspect of the invention includes a control unit for controlling the valve member to open or to close, preferably at least partially, more preferably partially and/or fully, the connection, in particular the common connection aperture, depending upon an engine operating condition, such as a predetermined rpm-range, for instance less than 2,000 rpm, less than 3,000 rpm, more than 3,000 rpm, more than 4,000 rpm, between 2,000 and 4,000 rpm, and/or depending upon a manual setting selected by a driver, such as a sport setting or a comfort setting.

A further development of an exhaust system according to the first and/or second aspect of the invention comprising valve member and a valve device may include a control unit adapted to control the valve member as well as the valve device according to at least one of the following settings: A first setting in which the connection, in particular the common connection aperture, is closed and in which the right exhaust tract aperture and the left exhaust tract aperture are opened (setting I). A second setting in which the connection, in particular the common connection aperture, is opened and in which the right exhaust tract aperture as well as the left exhaust tract aperture are opened (setting II). A third setting in which the connection, in particular the common connection aperture, is opened and in which the right exhaust tract aperture and the left exhaust tract aperture are fully closed (setting III). In setting I the connection, in particular the common connection aperture, is preferably completely closed and sealed. Preferably, the control unit is adapted to control the valve member according to either one of the first, second or third setting. More preferably, the control unit is adapted to control the valve member as well as the valve device exclusively according to the three above-mentioned settings I, II and III.

In a further preferred embodiment the control unit is adapted to control the valve member according to at least one further of the following settings: According to a fourth setting in which the connection, in particular the common connection aperture, is preferably fully closed and in which the right exhaust tract aperture and the left exhaust tract aperture are fully closed (setting IV). A fifth setting in which the connection, in particular the common connection aperture, is opened and in which the right exhaust tract aperture and/or the left exhaust tract aperture are/is partially closed (setting V). In setting V, an exhaust tract aperture which is not partially closed is fully opened. A sixth setting in which the connection, in particular the common connection aperture, is opened and in which one exhaust tract aperture (the left exhaust tract aperture or the right exhaust tract aperture) is preferably fully opened, wherein the other exhaust tract aperture, the left exhaust tract aperture or the right exhaust tract aperture, is fully closed (setting VI). Further settings are also possible.

In a further preferred embodiment according to the second aspect of the invention, the connection, preferably the common connection aperture, is provided in an essentially X-shaped pipe junction of the left exhaust tract and the right exhaust tract. An X-shaped pipe junction may be realized as described above with respect to the first aspect of the invention. Preferably, only one connection is provided for transferring exhaust gas between the exhaust tracts.

The first aspect of the invention and the second aspect of the invention can be combined. Preferably, any individual feature of the first aspect can be used in the invention according to the second aspect of the invention. In particular, individual features described above with respect to the second aspect of the invention can be used in the first aspect of the invention.

One or more exhaust manipulating device(s), such as an exhaust gas purification device, an exhaust gas cleaning device and/or an exhaust gas silencing device (in particular a muffler and/or catalyzer), can be arranged in one or preferably both of the exhaust gas tracts, for example between the engine and the pipe junction, between the pipe junction and an exhaust outlet, between the pipe junction and an upstream or downstream valve device, in a bypass line, in a main line upstream and/or downstream of a split-off position of a bypass valve or elsewhere.

The exhaust system realizes an exhaust gas tight confinement with respect to the atmosphere with the exception of the exhaust outlets which open into the atmosphere. By providing such an exhaust gas tight confinement, the exhaust gas is forced to flow from the engine through the at least one exhaust gas purification device, the exhaust gas cleaning device and/or the exhaust gas silencing device, before exiting into the atmosphere such that undesirable gas emissions and/or noise emissions are omitted. To this end, individual components of the exhaust system, particularly the exhaust gas purification device, the exhaust gas cleaning device and/or the exhaust gas silencing device, the pipe junction and/or the valve device are provided with a respective gas tight housing constructed with at least one interconnection inlet and at least one interconnection outlet, so that the gas tight housing does not interfere with the exhaust gas transport through the exhaust system.

BRIEF DESCRIPTION OF THE DRAWINGS

Further embodiments, features and technical aspects are described in the subclaims. Further details of preferred embodiments of the invention are shown in the enclosed figures in which:

FIG. 1 is a schematic illustration of a first embodiment of an exhaust system according to a general structure;

FIG. 6a shows a schematic sectional view of a pipe junction according to FIG. 5a;

FIG. 6b shows a side view of a valve member of the pipe junction according to FIG. 5a;

DETAILED DESCRIPTION

Figure 1A:
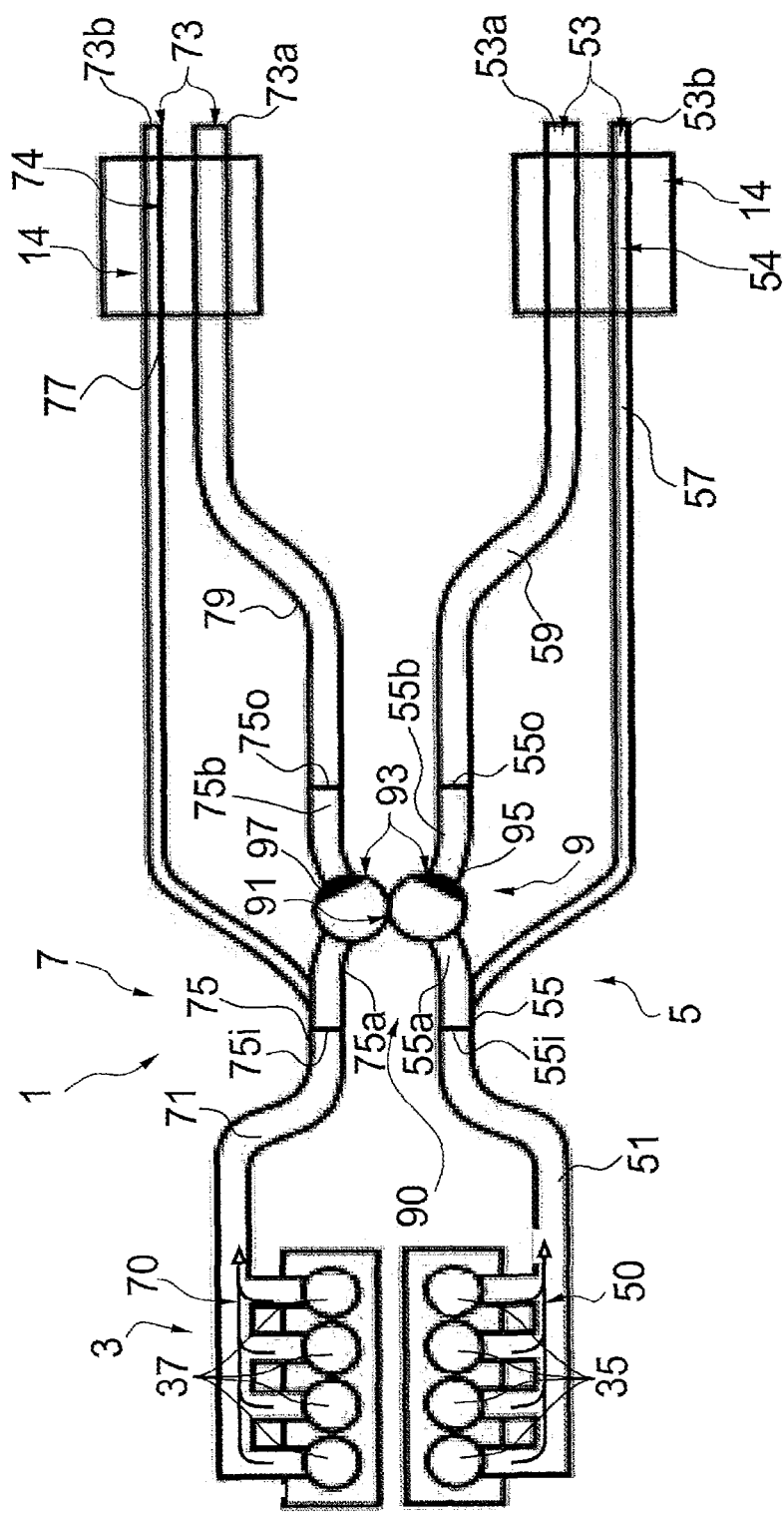
FIG. 1a is a schematic illustration of a second embodiment of an exhaust system according to a general structure.

The exhaust system for an internal combustion automotive engine is provided in general with reference number 1. The exhaust system comprises two exhaust tracts, namely a left exhaust tract 5 and a right exhaust tract 7. It shall be noted that the expressions "left" and "right" can indicate the mounting position of the exhaust system and/or the internal combustion engine, however, also two separated cylinder groups which are oriented in a vertical plane or in another direction can be described to be left or right in order to distinguish the two separate groups of cylinders and exhaust tracts 5, 7. It shall also be noted that the expressions "left" and "right" can be used to refer to exhaust tracts connected to an engine having cylinders arranged in single line but two separate exhaust tracts preferably provided for the exhaust gas of individual cylinders of said linear engine such that each cylinder delivers its exhaust gas exclusively to the left exhaust tract 5 or to the right exhaust tract 7.

The internal combustion automotive engine 3 illustrated in FIG. 1 indicates a V-8-engine including a left group of four cylinders 35 and a right group of four cylinders 37. It shall be clear that the principle according to the invention can also be used with a V-engine of a different number of cylinders, such as a V6- or V12-engine, or the like, or for instance a boxer engine.

Each group of cylinders 35, 37 of the engine 3 is connected to an exhaust tract 5, 7 for transporting exhaust gas from the cylinders 37, 35 to the atmosphere. A right group of cylinders 37 is connected to a tract inlet 71 for delivering the exhaust gas downstream and the left row of cylinders 35 is connected to a left tract inlet for transporting the exhaust gas away from the left row of cylinders 35.

The left exhaust tract 5 comprises, arranged in the following order between the left row of cylinders 35 and the atmosphere, a tract inlet 51 leading to a connection pipe 55, a connection pipe 55, and, downstream from the connection pipe 55, a removal pipe 59 eventually leading to an exhaust outlet 53. In the same fashion, the right exhaust tract 7 comprises, in the order from the right row of cylinders 37 towards the atmosphere, an tract inlet 71 for receiving the exhaust gas from the right row of cylinders 37 and for transporting it away from the cylinders, a right connection pipe 75 receiving the exhaust gas from the tract inlet 71, and a removal pipe for transporting the exhaust gas out of the connection pipe 75 towards a right exhaust opening 73.

Each exhaust tract 5, 7 can comprise further members such as a left or right valve device 52, 72 and a respective right or left rear muffler 14 arranged close to the respective right or left exhaust outlet 53, 73. Each tract 5, 7 further comprises at least a right or a left bypass line 57, 77, which is in FIG. 1 divided from the removal pipe 59, 79 upstream from the right and left valve devices 13. The exhaust system 1 according to FIG. 1 has two right exhaust outlets 73 and two left exhaust outlets 53, a respective main exhaust outlet 53a, 73a and a second exhaust outlet 53b, 73b or bypass exhaust outlet. The bypass exhaust outlet 53b, 73b and/or the bypass line 57, 77 have a diameter for delivering exhaust gas to the atmosphere which is preferably smaller than the diameter of the main exhaust outlet 53a, 53b or the respective tract 5 or 7.

The valve device 13 or bypass activation valve is arranged in the respective removal pipes 59, 79 of the left tract 5 and the right tract 7. The respective bypass line 57, 77 is split-off from the removal pipe 59, 79 upstream from the bypass activation valve 13. As long as the bypass activation valve 13 is in its opened or passive state, the exhaust gas can freely pass through a respective tract aperture from the connection pipe 55, 75 towards the main exhaust outlet 53a, 73a. Releasing exhaust gas through the larger diameter main exhaust outlet 53a, 73a allows for a larger amount of air or exhaust gas to be removed with less streaming resistance (and less noise reduction) through the respective exhaust tract 5, 7.

In the active or closed condition of the valve device 13, the tract aperture is closed such that the exhaust gas is forced to flow through the respective bypass line 57, 77 of the left or right exhaust tract 5, 7 and to exit through the bypass opening 53b, 73b and thus through a relatively small exhaust opening. The active condition of the valve device 13 thus restricts the flow of the exhaust gas from the engine 3 to a relatively small bypass pipe 57, 77 which reduces the noise emission of the exhaust system. It shall be clear that the essential difference of the main removal pipe 59, 79 and the main exhaust outlet 53a, 73a, with respect to the bypass line 57, 77 and the bypass exhaust outlet 53b, 73b is the increased flow resistance to exhaust gas in the bypass line 57 and/or outlet 53b, 73b and a greater silencing effect.

A valve device 13 can be controlled to adjust the effective size of the tract aperture continuously from being fully closed to be fully opened, from 0% opening to 100% opening, which allows for a very fine tuned regulation.

In the preferred embodiment according to FIG. 1 (and also FIG. 1a), this resistance is realized by means of a significantly smaller pipe diameter of both, the bypass line 57, 77 and the bypass outlet 53b, 73b with respect to the corresponding components of the main line 59 and main outlet 53a. However, such a resistance can also be realized by reducing the size of only parts or sections of the bypass line 57, 77 or only the bypass outlet 53b, 73b.

The bypass activation valves 13 of both tracts 5, 7 can be set to be opened (or passive) for a more sporty and more performant driving. The bypass activation valves 13 of both tracts 5, 7 can be closed (or activated) for reason of noise reduction and/or if the car is not driven in a sporty or highly performant way.

It is also possible to open one valve device 13 of either the right tract 7 or the left tract 5 and to close (or activate) the other tract's (5 or 7) valve device 13. A valve device setting in which for instance the right valve device 13 is closed and wherein the left valve device 13 is opened or vice versa can realize an intermediate setting with a medium increase in performance and allowing for a medium increase in sound emission.

Further, with respect to the preferred embodiment of the exhaust system 1 illustrated in FIG. 1, the exhaust system 1 comprises a pipe junction 9 in which the left connection pipe 55 and the right connection pipe 75 are joined such that the connection pipes 55, 57 form a common connection aperture 91 for transferring exhaust gas between the tracts 5, 7.

The pipe junction 9 is essentially X-shaped. The X-shape of the pipe junction 9 is realized essentially by the shape of the right and left connection pipes 55, 75, each of which is bent to realize a U-shape or V-shape. The left connection pipe 55 and the right connection pipe 57 are joined at the respective tips of the U- or V-shape. Each connection pipe 57, 75 can be divided into sections: A junction section 56, 76, where the left connection pipe 55 and the right connection pipe 75 are connected to one another such that they realize a common connection aperture 91 through which exhaust gas can pass from the left exhaust tract 5 to the right exhaust tract 7 and vice versa. Upstream from the junction sections 56, 76, each connection pipe 55, 75 has an inlet section 55a, 75a or pipe arm through which exhaust gas can pass from the respective tract inlet 51 or 71 towards the junction sections 56, 76.

Downstream from the junction sections 56, 76 each connection pipe 55, 75 comprises an outlet section or pipe leg 55b, 75b for transferring the exhaust gas from junction sections 56, 76 and in particular the common connection aperture 91 to the respective left removal pipe 59 or right removal pipe 79.

The left pipe arm 55a has an upstream inlet aperture 55i which is connected to the left tract inlet 51 for receiving exhaust gas therefrom. In a similar manner the right inlet section or the pipe arm 57a has a right inlet aperture 75i connected to the right tract inlet 71 for receiving exhaust gas from the right tract inlet 71. Exhaust gas from the right row of cylinders 37 passes through the right tract inlet 71 exclusively into the right connection pipe 75 and the inlet aperture 75i thereof. Similarly, exhaust gas from the left row of cylinders 35 is transported away from the cylinders 35 through the tract inlet 51 exclusively into the left connection pipe 55 and the left connection pipe 55 has an inlet aperture 55i for receiving the exhaust gas from the left tract inlet 51.

The pipe junction 9 comprises a valve member 93 which can be closed to separate the exhaust gas in the left exhaust tract 5 from the exhaust gas in the right exhaust tract 7 such that the exhaust gas removed from the left row of cylinders 53 into the left inlet tract 51 (indicated by the arrows 50) is completely transferred through the left connection pipe 55 into the left removal pipe 59 and flows therethrough (as indicated with arrow 60). In essentially the same manner, the exhaust gas (indicated with arrow 70) which exits from the right row of cylinders 33 into the right tract inlet 71 is completely transported through the right connection pipe 75 into the right removal pipe 79 and transported therethrough towards the right exhaust openings 73 (as indicated with arrow 80). The above described closed state of the pipe junction 9 can be described as a passive state or separation state.

The pipe junction 9 can also be used in an opened state which can be described as an active state or mixing state. For the active or mixing state of the pipe junction 9, the valve member 93 is open and thus allows for a fluid communication between the left connection pipe 55 and the right connection pipe 75 through the common connection aperture 91. In this state of the pipe junction 9, the exhaust gas 70 ejected from the right row of cylinders 37 passes into the inlet section 75a of the right connection pipe 75 and can than either pass directly through the pipe leg or outlet section 75b of the right connection pipe 75 into the right removal pipe 79. Further, in the open state of the pipe junction 9, the exhaust gas 70 from the right row of cylinders 37 can also pass from the right inlet sections 75a through the common connection aperture 91 into the left connection pipe 55, preferably in order to be ejected into the left removal pipe 59 for further transportation towards the atmosphere.

Similarly, when the valve member 93 is open and essentially leaves the common connection aperture 91 between the left connection pipe 55 and the right connection pipe 75 open, exhaust gas ejected from the left row of cylinders 35 can pass through the tract inlet 51 of the left exhaust tract into the inlet section 55a of the left connection pipe 55 and either to the left outlet section 55b into the removal pipe 59 or through the common connection aperture 91 to the right connection pipe 75, preferably to be ejected through the right pipe leg 75b into the right removal pipe 79.

The common connection aperture 91 can be influenced in the size of its mixing area or effective throughput area by a preferably continuous adjustment of the valve member 93. The valve member 93 can restrict the flow through the common connection aperture 91 by covering 0% to 100% of the mixing area defined by the common connection aperture 91. The exchange of exhaust gas between the left exhaust tract 5 and the right exhaust tract 7 can be fine-tuned in this manner.

The X-shaped junction 9 can for example be realized by bending two pipes into a sectionally arcuate shape (such as a U-shape), and by subsequently removing a preferably circular area which is coaxial with the symmetry axis of the U-shaped pipe at the tip of the pipe so that each pipe has a substantially identical circular aperture at the tip thereof. The two pipes can then be joined at their circular apertures such that a common connection aperture 91 between the left connection pipe 55 and the right connection pipe 75 is realized. It shall be clear that there is preferably no cylindrical tube-like section between the left connection pipe 55 and the right connection pipe 75 (i.e.: no H-tube), which tube-like section extends diagonally between the left and the right connection pipe 55, 75.

The connection pipes 55, 75 can also have another shape than a circular cross-section, for instance a quadratic cross-section, an elliptical cross-section, a polygonal cross-section, or the like. The aperture in the pipe section for realizing the common connection aperture does not need to be circular but can also for instance be quadratic, rectangular, polygonal, elliptical, or the like.

The cross-sectional area of the main pipes of the left exhaust tract 5, that is, the pipe realizing the tract inlet 51 downstream of the last cylinder of the left row 35, the inlet section 55a, the outlet section 55b and preferably also the junction section 56 and the removal pipe 59 are preferably essentially constant. The same applies to the main pipes of the right exhaust tract 7, namely the tract inlet 71 downstream from the right cylinders, the right inlet section 75a, the right outlet section 75b and the right removal pipe 79 as well as preferably the junction section 76 of the right connection pipe 75 are preferably constant. In particular, the cross-sectional area of the left exhaust tract 5 and the right exhaust tract 7 may be essentially equal to one another or tracts can be essentially mirror-symmetrical to each other.

The cross-sectional area of the common connection aperture 91, which may be called the mixing area, as it is the area through which exhaust gas may pass from one exhaust tract to the other, measures at least 0.25 and at most 4 times the size of a reference area defined by the cross-sectional area of the left or right exhaust tract 5 or 7, or particularly defined by the cross-sectional area of the left or right connection pipe 55 or 75, in particular at a respective inlet aperture 55i, 75i or outlet aperture 55o, 75o thereof. In particular, the mixing area is at least 0.5 and at most 2.0 of the size of the reference area. Preferably, the size of the mixing area is at least ¾ and at most 1.5 times of the size of the reference area. More preferably, the size of the mixing area is between 90% and 110% of the size of the reference area. Most preferably, the mixing area and the reference area are of the same size.

The reference area can also be defined by the cross-sectional area of the left connection pipe 55 or the right connection pipe 75 or by a sum of the cross-sectional areas of both connection pipes 55, 75 perpendicular to the mixing area at the center of the junction sections 56, 76 or at the center of the mixing area.

The pipe junction 9 and particularly the common connection aperture realizes the one and only connection for transferring exhaust gas between the left exhaust tract and the right exhaust tract 7. The exhaust system is free of any bypass line through which exhaust gas could flow from a tract inlet 51, 71 upstream of the pipe junction 9 directly to a removal pipe 59, 79 downstream from the pipe junction 9, without flowing through at least one of the connection pipes 55, 75 of the pipe junction 9.

Each individual exhaust opening 53a, 53b, 73a, 73b exits immediately into the atmosphere. In particular, the bypass lines 57, 77 of the exhaust system are realized separately from one another and have no fluidal connection for the interchange of exhaust gas. The main exhaust lines, in particular the removal pipes 59, 79, downstream the valve device(s) 13 are realized separately from one another so that no fluidal connection for the interchange of exhaust gas is realized downstream of the pipe junction 9.

In the exhaust system 1 according to the preferred embodiment shown in FIG. 1, essentially all of the exhaust gas 52, 72 ejected by the engine 3 has to flow through the pipe junction 9, that is, at least one of the connection pipes 55 and/or 75 of the pipe junction 9, before the gas ejected by the engine is ejected into the atmosphere from the exhaust system 1. Exhaust gas 54, 74, which has passed through a valve device 13 or bypass activation valve, is led directly into the atmosphere. It shall be clear that after passing through the bypass activation valve 13, the exhaust gas 54 in the left exhaust tract 5 as well as the exhaust gas 74 in the right exhaust tract 7 might pass through a designated right or left gas exhaust manipulating device, such as a cleaning and/or silencing device, particularly a catalyzer or muffler, such as a rear muffler 14. However, in the first embodiment of the invention shown in FIG. 1, the exhaust gas 54 in the left exhaust tract 5, after passing through the left bypass activation valve 13, cannot be transferred into the right exhaust tract 7 any more before exiting into the atmosphere. Vice versa, any exhaust air 74 in the right exhaust tract 7, after having passed through the right valve device 13, it is not allowed to be transferred into the left exhaust tract 5 any more, before exiting directly or indirectly into the atmosphere.

The X-shaped junction 9 comprises outlet sections 55b, 75b, each one either belonging to the left connection tube 55 or the right connection tube 75. The left outlet section 55b leads from the junction section 56 to a left outlet aperture 55 or towards a left removal pipe 59. The right outlet section 75b leads from a right junction section 76 to a right outlet aperture 75o towards the right removal pipe 79.

Figure 2:
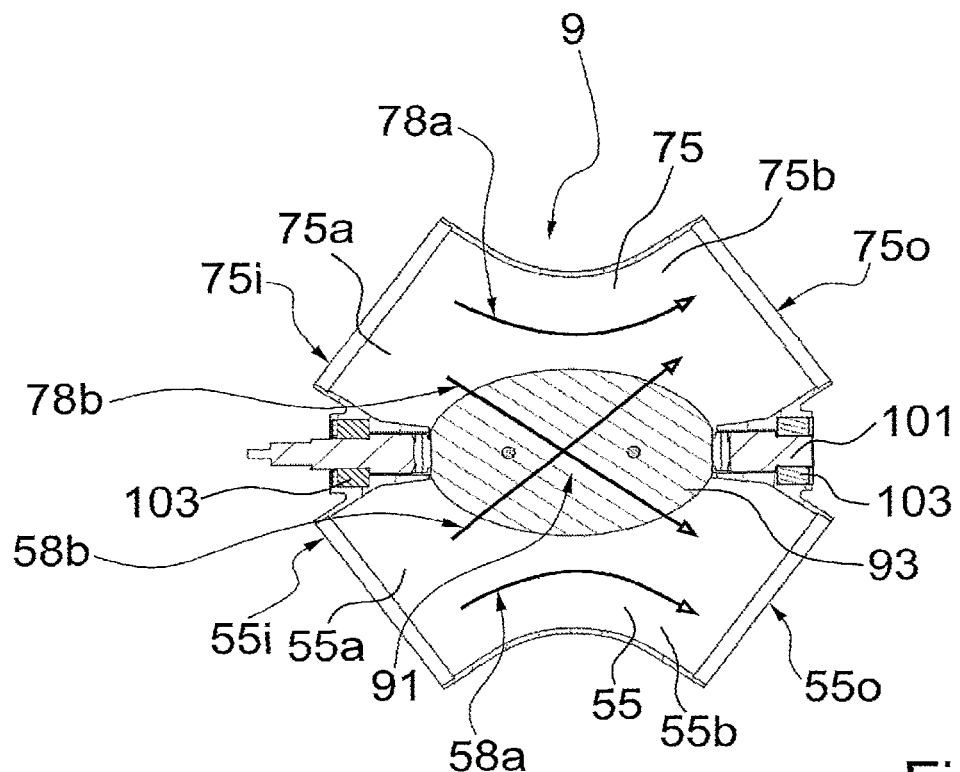
FIG. 2 is a schematic sectional view of a pipe junction including an open valve member according to a first embodiment.
Figure 3:
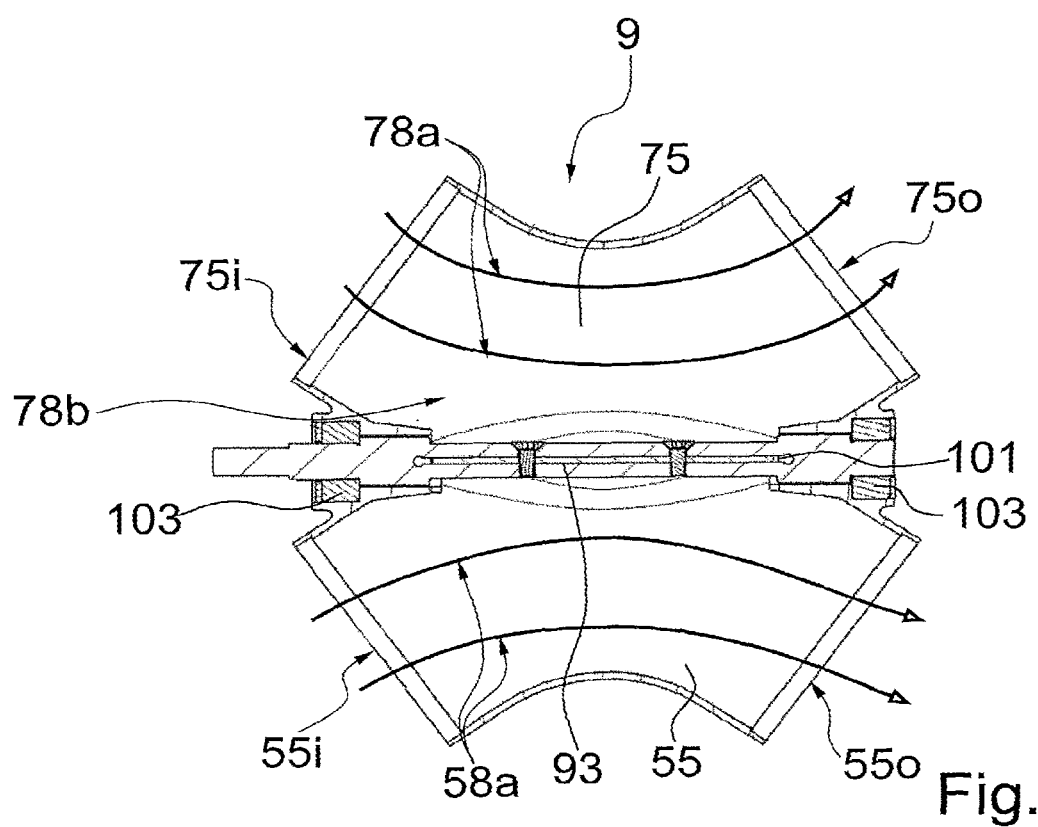
FIG. 3 is a schematic sectional view of the pipe junction according to FIG. 2 comprising a closed valve member.
Figure 4:
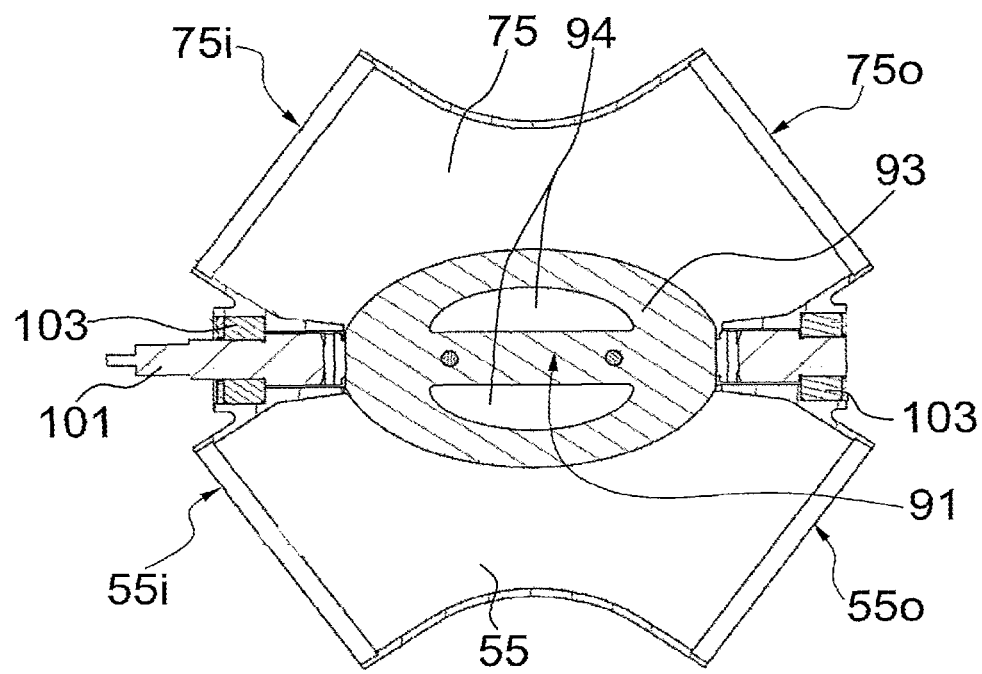
FIG. 4 shows a specific embodiment of the pipe junction similar to that of FIG. 2 in which the valve member comprises bypass apertures.

The preferred embodiment of an exhaust system 1 as shown in FIG. 1a is for the most part identical to the exhaust system 1 shown in FIG. 1. The same reference numerals are therefore used to designate the same or similar components. The pipe junction 9 of the embodiment shown in FIG. 1a is different from the pipe junction 9 according to the embodiment shown in FIG. 1 in that it uses the pipe junction described below with respect to FIGS. 5 through 9. However, a pipe junction as shown in FIG. 2, 3 or 4 or as shown in FIGS. 10 through 13 could also be used in the embodiment of an exhaust system 1 as shown in FIG. 1*a*.

The main difference of the exhaust system 1 according to FIG. 1*a* with respect to the exhaust system shown in FIG. 1 is realized by the bypass lines 57, 77 which are split-off from the main exhaust tract upstream of the junction sections 56, 76 of the pipe junction 9. In FIG. 1*a*, exhaust gas which does not flow through the pipe junction 9 must pass through one of the bypass lines 57, 77 which exit to the atmosphere. Similar embodiments (not shown) can be realized by splitting-off the bypass line 57, 77 anywhere between the cylinders 35, 37 and the common connection aperture 91.

As indicated in FIG. 1*a*, the exhaust system 1 shown therein is particularly suitable for exhaust systems that implements a pipe junction 9 according to one of the embodiments shown in FIGS. 5 to 13, in which the pipe junction 9 includes a common valve device 90, as will be described in detail below. In such an arrangement, further valve devices downstream of the pipe junction can be omitted.

The exhaust system 1 as shown in FIG. 1*a* is particularly suitable for cars with a rear engine layout, in which the exhaust system is more compact. The length of the bypass lines 57, 77, as shown in FIG. 1*a* are thus understood to be exaggerated for such a rear engine layout.

A first preferred embodiment of a pipe junction of an exhaust system 1 according to the invention is shown in FIGS. 2 and 3, in which FIG. 2 illustrates the pipe junction 9 in its open or active mixing state and wherein FIG. 3 shows the pipe junction 9 in its closed or passive separation state. As the pipe junction 9 shown in FIGS. 2 and 3 can preferably be used in an exhaust system 1 according to FIG. 1, in which the pipe junction 9 is arranged upstream from the right valve device 72 and upstream from the left valve device 52, reference numeral used in FIGS. 2 and 3 which are identical to earlier mentioned reference numerals refer to the same or similar components or features.

In the pipe junction 9 of FIGS. 2 and 3, the connection pipes 55, 75 are realized by arcuate pipes which are joined at their tip such that a common connection aperture 91 is formed, through which, in the open state of the pipe junction 9, as shown in FIG. 2, exhaust gas 78*b* from the right row cylinders 37 can freely flow from the right exhaust tract 7 to the left exhaust tract 5 and such that exhaust gas 58*b* can freely flow from the left row of cylinders 35 into the right exhaust tract 7. At the same time, exhaust gas 58*a* from the left row of cylinders 35 can still remain within the left exhaust tract 5 by passing from an inlet aperture 55*i* of the left connection pipe 55 to the outlet aperture 55*o* of the left connection pipe. In the same manner, exhaust gas from the right row of cylinders 37 can remain within the right exhaust tract by passing from a right inlet opening 75*i* of the right connection pipe 75 to its right outlet opening 75*o*, as indicated with arrow 78*a*.

The valve member 93 which is illustrated as being opened in FIG. 2 is a simple flap connected to a rotatable shaft 101, for instance by means of screws. The shaft 101 is rotatably secured to the pipe junction 9 by means of two diametrically opposite bearings 103, one upstream and the other one downstream with respect to the common connection aperture 91. The upstream and/or the downstream bearing 103 can be realized by a roller bearing, but, for ease of maintenance, it is preferably realized by a sliding bearing. The shaft 101 is actuated by an electronic motor 99, such as a servomotor, which is controlled by an electronic control unit 11 of the exhaust system 1 (not illustrated in FIG. 1*a*).

The same electronic control unit can control the valve member 93 in order to open or close, or partially open or partially close, the common connection aperture 91 as well as a valve device 13 for closing a tract aperture in the right 7 and/or the left tract 5. The control electronics 11 can control a valve device 13 such that it only either fully opens the tract aperture or fully closes the tract aperture, but preferably also such that a partially opened or closed state of the tract aperture can be achieved via the valve device 13.

The flap 93 which realizes the valve member of the preferred embodiment of the pipe junction 9 according to FIGS. 2 and 3 is of essentially the same area as the area of the common connection aperture 91 or mixing area, such that the flap 93 can completely close the common connection aperture 91 in order to inhibit sound and/or exhaust gas from transferring between the left tract 5 and the right tract 7. In FIG. 2, the shape of the flap 93 is essentially elliptical and the shape of the common connection aperture 91 (not shown), which corresponds to the flap 93, is also elliptical. As described above, the geometry of the aperture 91 can be shaped according to one of several possible geometrical configurations, and it shall be clear that the flap 93 shall be shaped accordingly. While an elliptical shape of the aperture 91 and the flap 93 is advantageous with respect to the aerodynamic properties of the pipe junction 9, a quadratic or rectangular shape may be selected instead to simplify manufacturing. It shall be clear that a shape described as rectangular or quadratic may have rounded corners.

The movement of the valve member 93 can be restricted, particularly to a rotation of about 90° between the closed and the open state, using a mechanical restriction acting upon the valve member 93, the shaft 101, or the electric motor 99, or by an electric or electronic restriction of the electric motor 99, for example by means of programming the controller 11 or by using electronic components in the electronic supply of the electronic engine 11 which inhibits the engine from moving for more than a certain predefined range, particularly 90°.

FIG. 3 shows the closed or separation state of the pipe junction 9 in which the valve member 93 closes the common connection aperture 91 of the pipe junction 9. In the closed state of the pipe junction 9, exhaust gas from the left row of cylinders 35 passes through the left connection pipe 55 from its inlet opening 55*i* to its outlet opening 55*o*, exclusively, as indicated with the arrows 58*a*. In the same manner, exhaust gas 72 from the right row of cylinders 37 passes exclusively through the right connection pipe 75 from its inlet opening 75*i* to its outlet opening 75*o*, as indicated with the arrows 78*a*. In other words, the closed pipe junction 9 shown in FIG. 3 realizes an embodiment of a junction in an operating state in which no exhaust gas from the right row of cylinders 37 is ever passed from the right exhaust tract 7 to the left exhaust tract 5 and in which no exhaust gas 52 from the left row of cylinders 35 is transferred from the left exhaust tract 5 to the right exhaust tract 7.

As can be seen in FIGS. 2 and 3, a pipe junction 9 in an exhaust system 1 according to the invention is essentially free of any transferring tubes between a left and a right connection tube 55, 75, such as the transfer tube of U.S. Pat. No. 7,703,574 B2. Rather, in the pipe junction 9 of the exhaust system according to the invention, a left connection pipe 55, through which the exhaust gas flows from the left row of cylinders 35 towards the left exhaust openings 53 is directly joined to a connection pipe 75 of the right exhaust tract 7. Such a pipe junction 9 minimizes any impairments of the sound transmission and/or exhaust gas transmission between the left exhaust tract 5 and the right exhaust tract 7.

FIG. 4 shows an optional pipe junction 9 similar to that of FIG. 2 in which the flap 93 comprises two bypass apertures 94. A bypass aperture 94 arranged in the valve member 93 allows for a small amount of leakage between the left and right exhaust tracts 5, 7 such that, when the valve member 93 is moved from its fully closed position towards an opened position, no sudden changes in exhaust air transferal and/or sound transferal occur. Preferably, such a bypass aperture 94 is significantly smaller than the connection aperture 91. In particular, the area of the bypass aperture 94 is less than 50%, preferably less than 30%, more preferably less than 20%, most preferably less than 10% of the size of the common connection aperture 91. A bypass aperture similar to the aperture 94 in the valve member 93 can also be realized by dimensioning the valve member 93 smaller than the common connection aperture 91.

An effect similar to that of the pipe aperture 94 of the pipe junction 9 shown in FIG. 4 can also be achieved in the pipe junction 9 according to FIGS. 2 and 3 if the valve member 93 is brought into a state in which it does not fully close the common connection aperture 91. As described above, a movement restriction of the valve member 93 in the embodiments shown in FIGS. 2 and 3 can be realized mechanically, electrically or electronically. The movement of the valve member shown as a flap 93 can for example be restricted to less than 90°, for example to about 95° or 80°. A valve member 93 can be free of any mechanical inhibition and be able to rotate for 180°, 360°, or more, can possibly be restricted by the specification of the electric motor 99 or control unit 11. The flap 93 of FIG. 4 has two bypass holes therein. Alternatively, one hole, three holes, four holes, or even more holes can be arranged in a similar flap 93. Their combined area defines the valve bypass area.

Figure 5A:
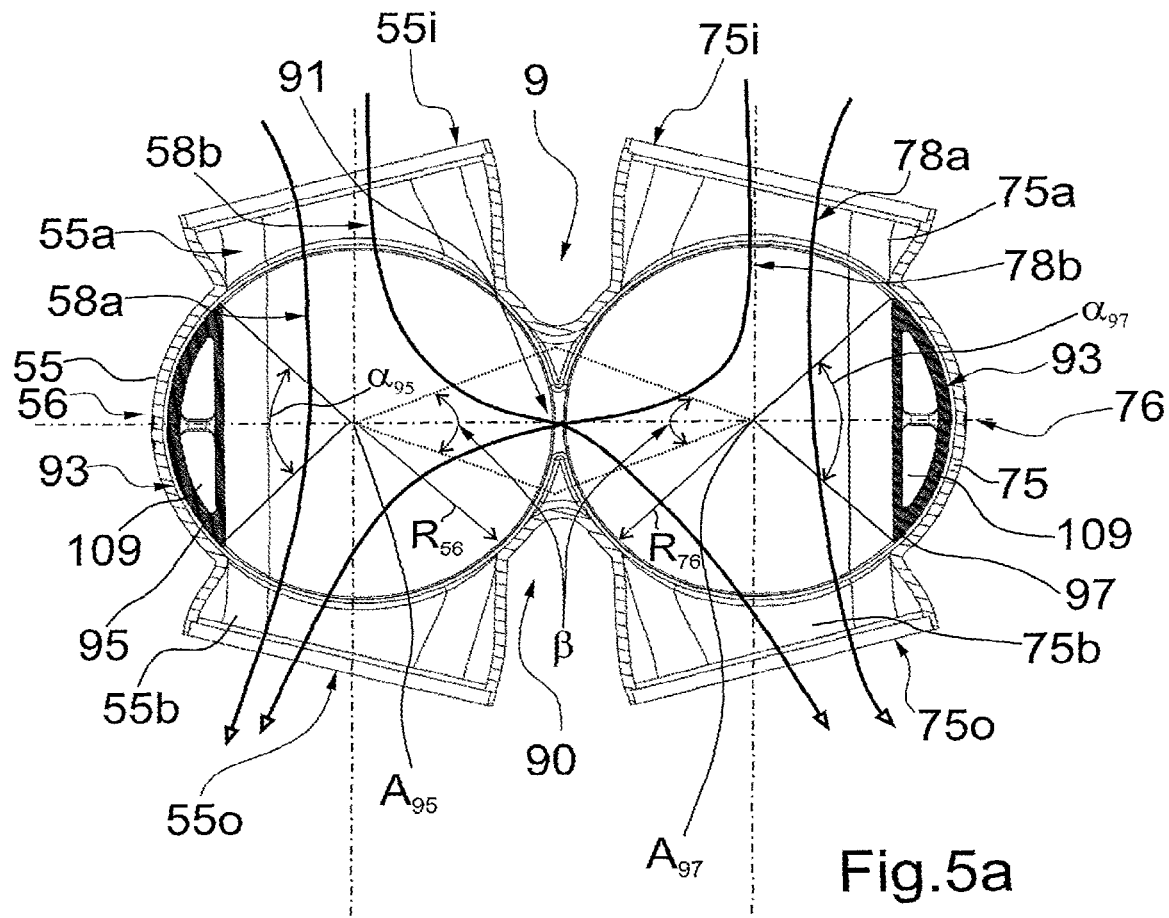
FIG. 5a shows a top view onto a pipe junction according to a second embodiment including two valve member.
Figure 5B:
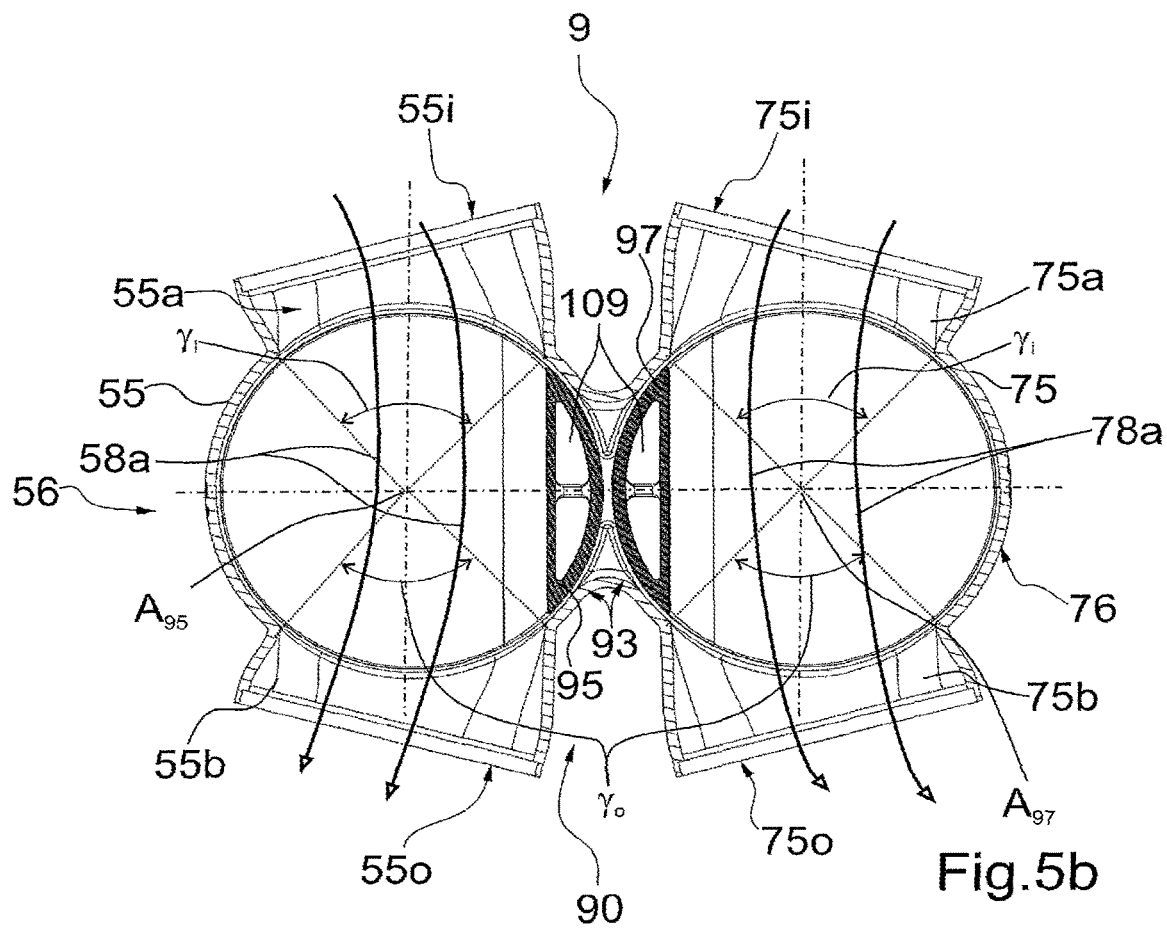
FIG. 5b shows a top view onto the pipe junction according to FIG. 5a in another setting.

Another design of the pipe junction 9 for an exhaust system 1 according to the invention is shown in FIGS. 5a and 5b. The same reference numerals which have been used in FIGS. 1 through 4 are used for the same or similar components also in FIGS. 5a and 5b as well as the subsequent figures which show different views, details and/or settings of the embodiment of FIGS. 5a and 5b.

The pipe junction 9 is shown in its open or mixing state in FIG. 5a and in its closed or separation state in FIG. 5b. As explained with respect to FIG. 2a the open state of the pipe junction 9 shown in FIG. 5a allows for the exhaust gas from each group of cylinders 35, 37 to be transferred to the exhaust output 53, 73 either exhaust tract. The exhaust gas 50 ejected from the left group of cylinders 53 is led through the tract inlet 51 to the left connection pipe 55 in which it is free to either pass through the left outlet opening 55o towards the left exhaust openings 53 or through the common connection aperture 91 into the right connection pipe 76 and further towards the right exhaust openings 73. The exhaust gas 70 ejected from the right group of cylinders 37 is free to flow through the right connection pipe 75 either towards the right exhaust openings 73 or through a common connection aperture 91 into the left connection pipe 55 and towards the left exhaust openings 53.

In a closed state of the pipe junction 9 shown in FIG. 5b, the function of the pipe junction 9 is essentially equal to the function of the pipe junction shown in FIG. 3. However, in the embodiment shown in FIG. 5b, two valve members 93, a left valve member 95 and a right valve member 97, restrict the passage of exhaust gas through the common connection aperture 91 instead of just one valve member. The pipe junction 9 according to FIG. 5b would also be in a closed state if only one of the left or right valve members 95 or 97 closes the common connection aperture 91 (not shown). Using two valve members 95 and 97 increases the leak-tightness between the left exhaust tract 5 and the right exhaust tract 7.

In a similar fashion as described above with regard to FIG. 3, exhaust gas indicated with arrows 58a in FIG. 5b which has been ejected from the left group of cylinders 35 is transported exclusively to the left exhaust aperture 53 while exhaust gas 70 ejected from the right group of cylinders 37 is transported exclusively to the right exhaust opening 73, as indicated with arrows 78a in FIG. 5b.

Figure 6B:
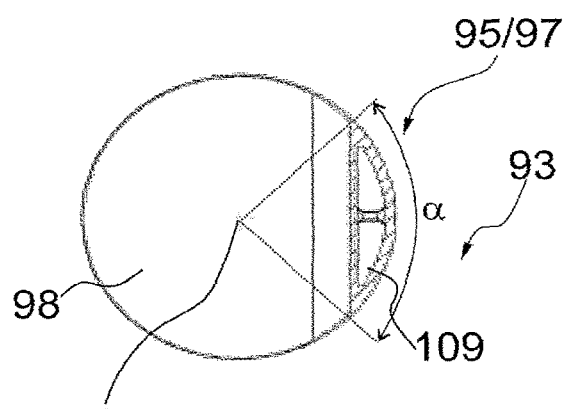
Figure 6C:
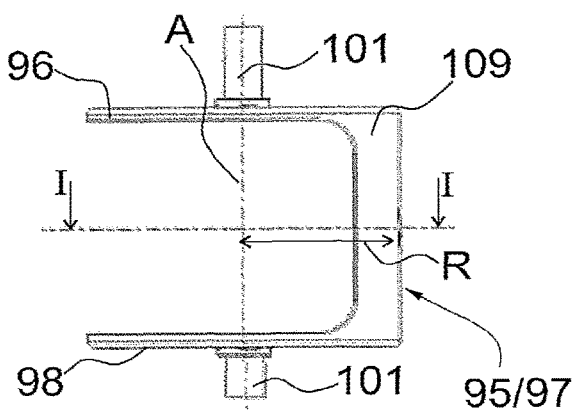
FIG. 6c shows a top sectional view of a valve member according to FIG. 6a through line I-I.
Figure 6A:
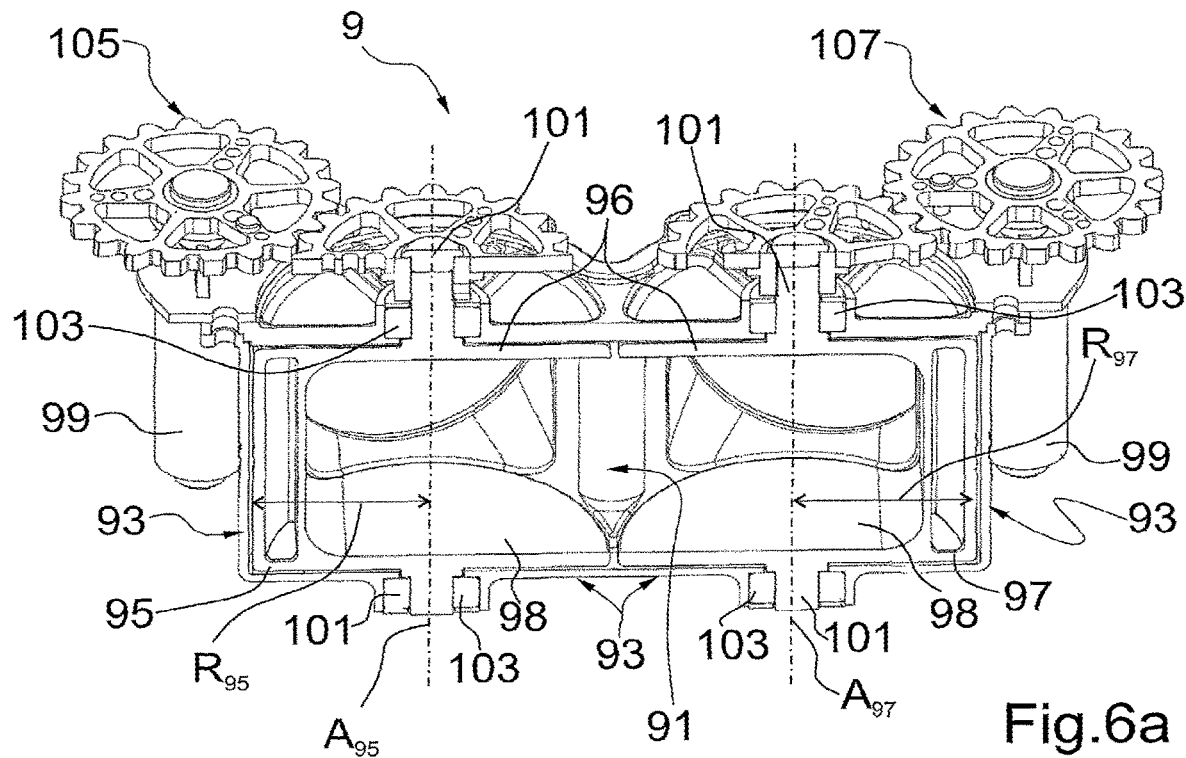

One respective valve member 95, 97 of the pipe junction 9 as shown in FIGS. 5a and 5b is illustrated in further detail in FIGS. 6a, 6b and 6c and can be described as an excentric flap or as a flap radially offset with respect to its axis of rotation ($A_{95}$, $A_{97}$).

In the preferred embodiment as shown in FIGS. 5a, 5b and 6a, the left valve member 95 and the right valve member 97 are essentially equal to one another so that the detailed view of FIGS. 6b and 6c can be seen as relating to both of the left and right valve members 95, 97. Naturally, the left valve member and the right valve member could alternatively be differently designed or be dimensioned differently with respect to one another.

As indicated in FIGS. 5a through 6b, each valve member 93 of the pipe junction 9 according to this embodiment can be rotated around a respective left or right axis of rotation $A_{95}$ or $A_{97}$ (indicated simply with the capital letter A in FIGS. 6c and b). The axis of rotation A ($A_{95}$ as well as $A_{97}$) is arranged essentially perpendicular with respect to the flow path from the engine to the exhaust opening and also perpendicular to the flow path through the center of the common pipe aperture 91. In other words, the left connection pipe 55 and the right connection pipe 75 are joined to form the common connection aperture 91 essentially at their circumference such that an imaginary line could be drawn from the center of the left connection pipe 55 to the center of the right connection pipe 75 through the center of the common pipe aperture 91 and that the axis of rotation $A_{95}$ or $A_{97}$ of the left valve member 95 or right valve member 97 would be perpendicular to both the above-mentioned imaginary line as well as the central flow path through the respective left or right connection pipe 55 or 75. As shown in FIG. 6a, the axes of the valve members 97, 95 are essentially parallel to one another.

Each valve member according to the embodiment of FIG. 6 comprises a preferably circular upper rotation plate 96 and a preferably circular lower rotation plate 98. Both the upper rotation plate 96 and the lower rotation plate 98 have a respective shaft portion 101 attached thereto which defines the axis of rotation A of the valve member 93. As shown in FIG. 6a, the valve member 93 is mounted to the pipe junction 9 by means of sliding bearings 103 in which the shaft portions 101 are rotatably borne around the left or right axis of rotation $A_{95}$ or $A_{97}$.

As shown in FIG. 6a, each valve member 93 is driven by a respective left or right electric motor, preferably a servomotor 99. The servomotors 99 can either be attached directly to a shaft portion 101 of a respective valve member 93 (not shown) or have a left or right gear box 105 or 107 for transferring a rotational movement from the electric motor 99 via the left gear box 105 to the left valve member 95 or from the right electric motor 99 via a right gear box 107 to the right valve member 97. A simplified version of the pipe junction 9 according to the embodiment of FIG. 6a could be realized with a common electric motor and a common gear box for driving both the left valve member 95 and the right valve member 97, preferably in a mirror-symmetric fashion.

However, individual electric motors 99 for individually actuating upon the left valve member 95 or the right valve member 97 independent of one another, as shown in FIG. 6a, are preferred. The arrangement of electric engines 99 which are not directly attached to the a shaft portion 101 is advantageous in that the available space in an automobile in which a pipe junction 9 can be arranged is usually restricted, so that the use of a gear box 105, 107 or a similar means for transferring rotational movement from a motor 99 to a valve member 93 is advantageous in using less space and/or providing more freedom to use the available space.

Coming back to FIGS. 6b and 6c, an axially extending wall 109 is connected to both the upper rotation plate 96 and the lower rotation plate 98. With respect to the axis of rotation A, the wall 109 extends essentially like a rectangular wall over a circumferential distance a along the radially outer circumference of the valve member 93 with respect to the axis of rotation A. The inside of said wall 109 is preferably flat and the outside preferably forms a cylinder section surrounding the axis of rotation A of the valve member 93. The wall 109 is preferably hollow such as shown in FIGS. 6a to 6c but can also be solid (not shown). The wall 109 of the valve member 93 can be used to shut the common connection aperture 91, as shown in FIG. 5b. To this end, the circumferential extension α of the wall 109 is at least as large as, preferably larger than the circumferential extension β of the common connection aperture 91 with respect to the axis of rotation A, as indicated in FIG. 5a. If the circumferential extension α of the wall 109 of the valve member 93 is smaller than the circumferential extension β of the common connection aperture 91, the individual valve members 95, 97 are not able to ever fully close the common connection aperture 91 such that a bypass opening is always maintained (not shown).

The pipe junction 9 shown in FIGS. 5 and 6 have essentially cylindrical junction sections 56, 76, in which the respective left or right valve member 95, 97 is arranged such that the valve member 95, 97 can freely rotate around its axis of rotation $A_{95}$ or $A_{97}$. A mechanical, electric or electronic restriction can be provided in a similar manner as described above with respect to the embodiments shown in FIGS. 2 through 4. The radial dimension $R_{56}$, $R_{76}$ of the junction section 56, 76 is essentially the same as the radial dimension R of the wall 109 such that the valve member can sealingly engage one, two or more sections of the junction section 56, 76 of the respective left connection pipe 55 or right connection pipe 75. In this context "sealingly engage" preferably means that a small gap may be maintained between the circumferential outside of the wall 109 and the circumferential inside wall of the junction section 76 or 56 to allow for thermal expansion and/or in order to reduce wear between the valve members 95, 97 and the wall of the junction section 56, 76 of the pipe junction 9.

The inlet section 55i, 75i and the outlet section 55o, 75o of the pipe junction 9 according to FIGS. 5 and 6 are realized such that they extend in a radial direction with respect to the axis of rotation $A_{95}$, $A_{97}$ of the respective left or right junction section 56, 76. A junction section 56, 76 comprises a rest surface on its circumferential inside which extends preferably between the inlet section 55a, 75a and the outlet section 55b, 75b. The wall 109 of the valve member 95, 97 can be placed at the rest surface such that the valve member does not constrict any of the openings of the junction section 56, 76 leading to the inlet section 55a, 75a, the outlet section 55b, 75b, or the common connection aperture 91. In alternative embodiments, which are not illustrated, a rest area could alternatively be provided between the inlet section 55a, 75a and the common connection aperture 91 and/or between the outlet section 55b, 75b of the common connecting opening 91. The rest area of the junction section 56, 76 has a circumferential dimension larger than the circumferential dimension α of the wall 109.

The circumferential extension $\chi 1$ of an inlet section and/or the circumferential dimension $\chi 0$ of an outlet section is preferably smaller than α so that the valve members 95, 97 can shut each aperture of the junction sections 56, 76.

The junction section 9 as described above with respect to FIGS. 5 and 6a works essentially identical to the junction section 9 according to the embodiments shown in FIGS. 2 and 3. However, in a preferred embodiment of the exhaust system 1 as shown in FIG. 1a, the pipe junction according to the design as described with respect to FIGS. 5 and 6 can be used for further settings which will be described in the following FIGS. 7, 8 and 9. The same reference numerals are used for the same or similar components of the pipe junction as before.

Figure 7:
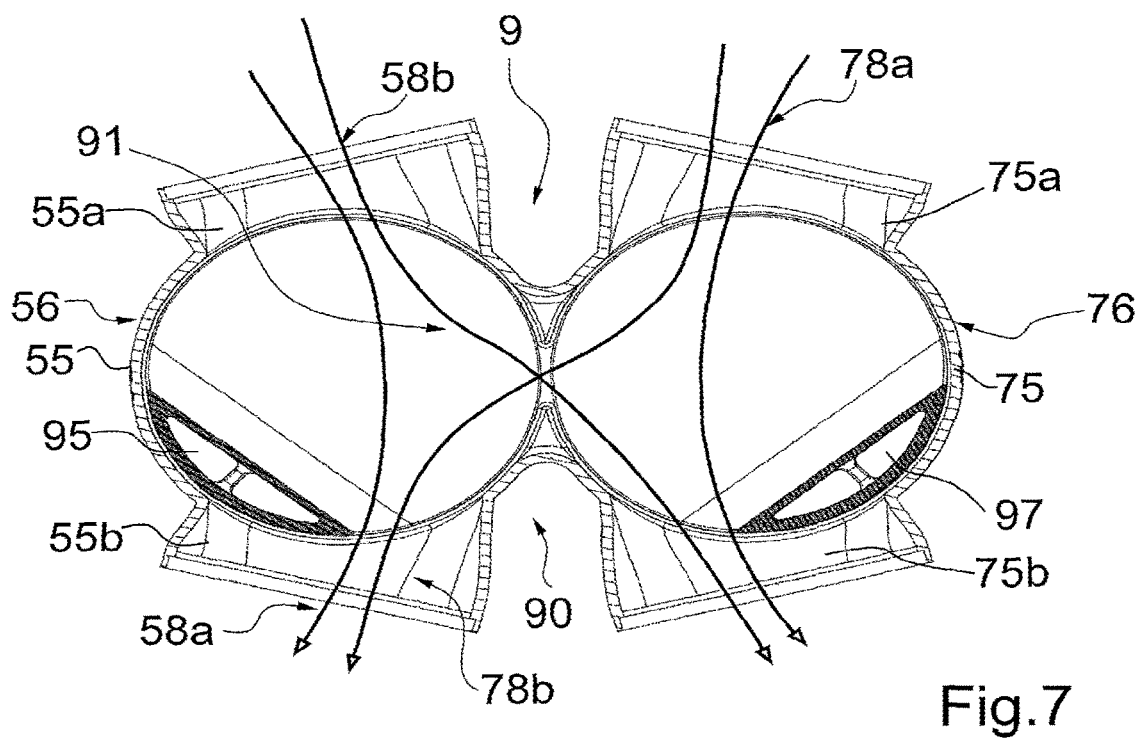
FIGS. 7 to 9 show further settings of the valve members in the pipe junction according to FIG. 5.

FIG. 7 shows the pipe junction in a state in which the valve members 95, 97 partially restrict the flow through the main exhaust tract by partially closing a tract aperture from the junction section 56, 76 towards the outlet section 55b, 75b, preferably for about 50% %.

Figure 8:
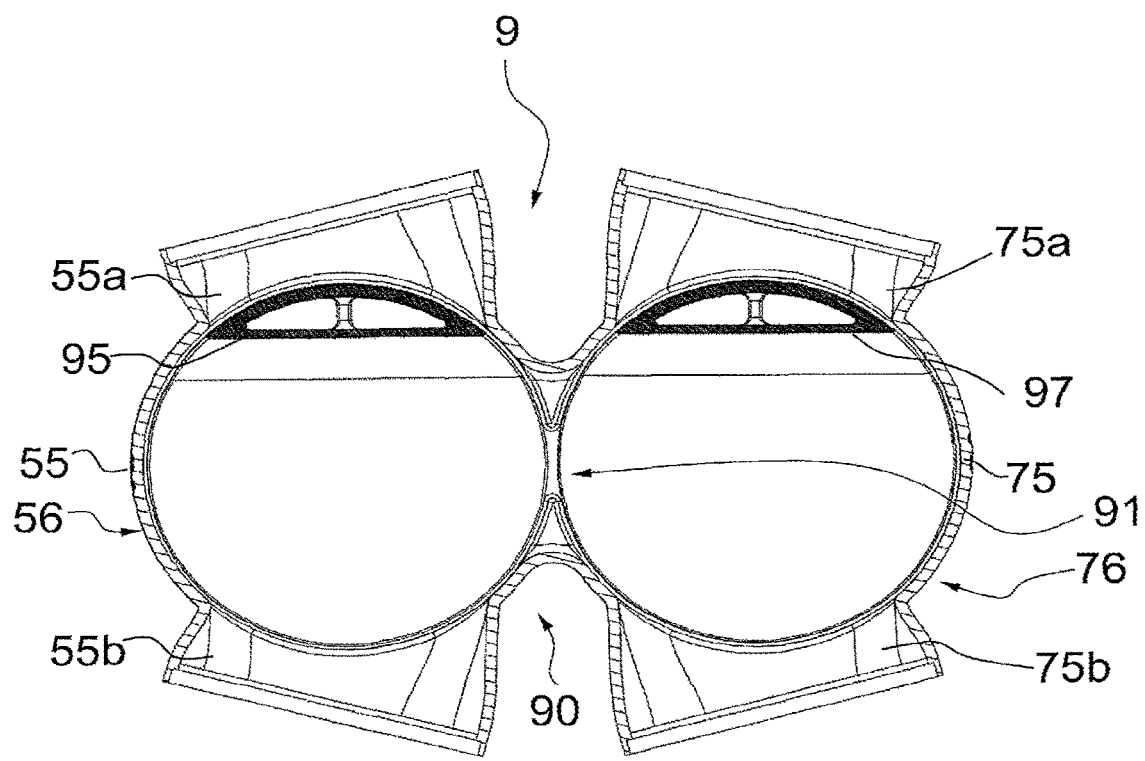
Figure 9:
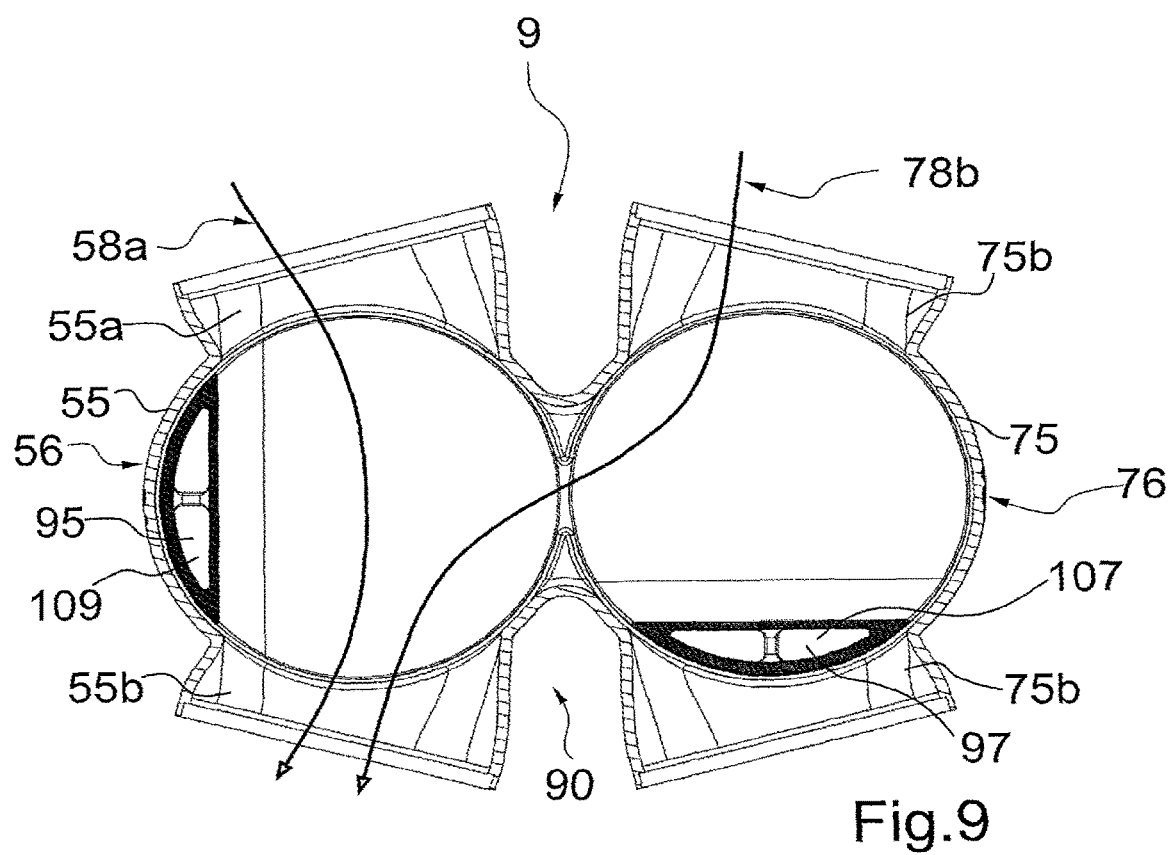

The possible use of the pipe junction 9 as a common valve device 90 including bypass activation valve 13 becomes particularly apparent in view of the states of the junction 9 illustrated in FIGS. 8 and 9. In FIG. 8, the valve members 95, 97 close both of the tract apertures between the respective left and right junction sections 56, 76 and the upstream pipe arms 55a, 75a of the pipe junction 9, so that no exhaust gas can pass through the pipe junction from either one of the cylinders 35, 37 to an exhaust aperture. An effect almost identical to the shut-down of the junction section 9 as shown in FIG. 8 could be achieved if the valve members 95, 97 were arranged to close the tract aperture between the junction sections 56, 76 and the outlet sections 55b, 75b.

FIG. 9 shows a state in which exhaust from both rows of cylinders 35, 37 can pass through the pipe junction 9 but only towards the left exhaust aperture 53. To this end, the tract aperture between the right junction section 76 and the right pipe arm 75b is closed by the right valve member 97, while the left valve member 96 is positioned in the rest area of the left junction section 56. This exhaust gas transport is indicated with arrows 58a and 78b.

The pipe junction 9 according to the preferred embodiment of FIGS. 5 and 6 could also be used in a similar manner as shown in FIG. 9, which is not shown, in order to lead exhaust gas from the entire engine 3 exclusively to the right exhaust aperture 73, if the tract aperture between the left junction section 55 and the left pipe leg 55b is closed by the left valve member 95 while the right valve member 97 is arranged with its wall 109 in the right rest area of the right junction section 76.

Figure 10:
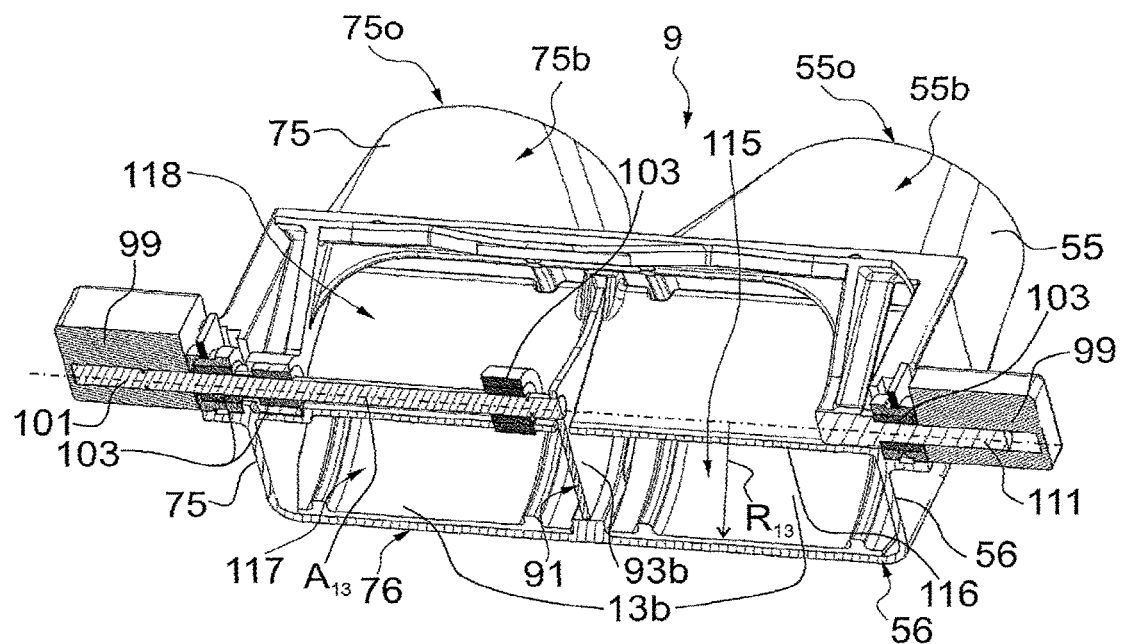
FIG. 10 shows a further embodiment of the pipe junction with a central valve member for opening and closing the connection aperture between the two exhaust tracts and a common valve member for opening or closing tract apertures of both tracts.

A further alternative embodiment of a pipe junction 9 is illustrated in FIGS. 10 through 13. The further alternative pipe junction 9 as shown in FIG. 10 may be used in the exhaust system 1 according to the preferred embodiment shown in FIG. 1 but is preferably implemented in an exhaust system 1 according to the preferred embodiment shown in FIG. 1a. Similar or identical reference numerals as used before are used to indicate the same or similar components.

The pipe junction 9 as shown in FIGS. 10 through 13 has two valve members 93b, 13b which are moved independently from one another. The central valve member 93b has a shaft 101 connected to a first electronic motor 99 and the second valve member 13b or common valve member has a second shaft 111 connected to a second electric motor 99. Both shafts 101, 111 are arranged coaxially with respect to the axis of rotation $A_{13}$ which extends essentially perpendicular through the left connection pipe 55, the right connection pipe 75 as well as the common connection aperture 91 (which is shown to be closed in both FIGS. 10 and 11). The junction sections 56, 76 of the left connection pipe 55 and the right connection pipe 75 are essentially rectangular in cross-section and form a common side wall in which the common connection aperture 91 is formed. Pipe arms 55a, 75a upstream from the junction section 56, 76 as well as the pipe legs 55b, 75b downstream from the junction section 56, 76 are shaped in a truncated manner to realize a transition between the junction section 56, 76, which has an essentially rectangular cross-section, towards an essentially circular cross-section at an inlet opening 55a, 75a or an essentially circular cross-section at an outlet opening 55o, 75o.

Figure 11:
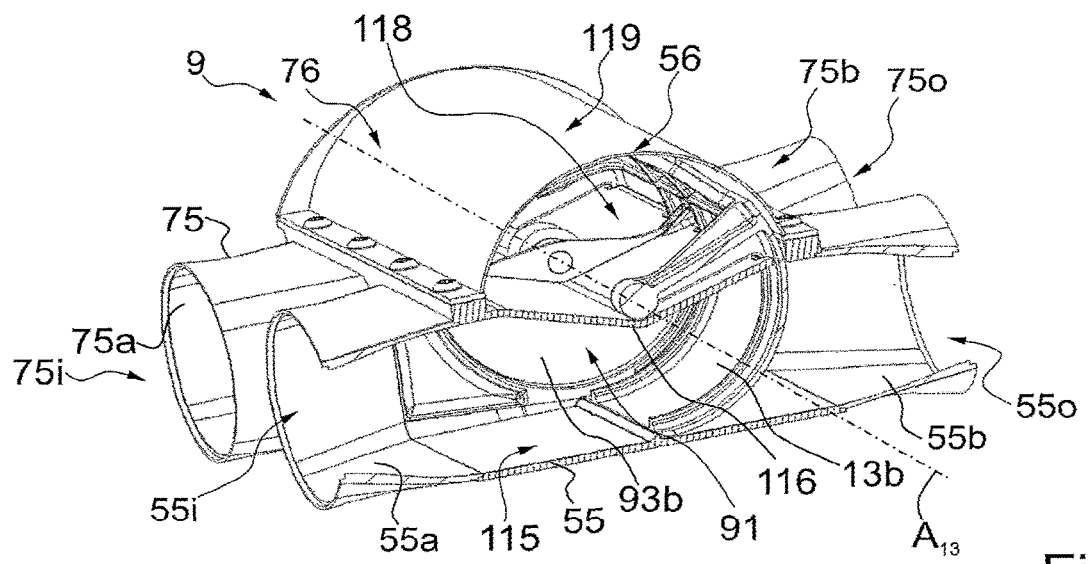
FIG. 11 shows a side sectional view of the pipe junction according to FIG. 10.
Figure 12:
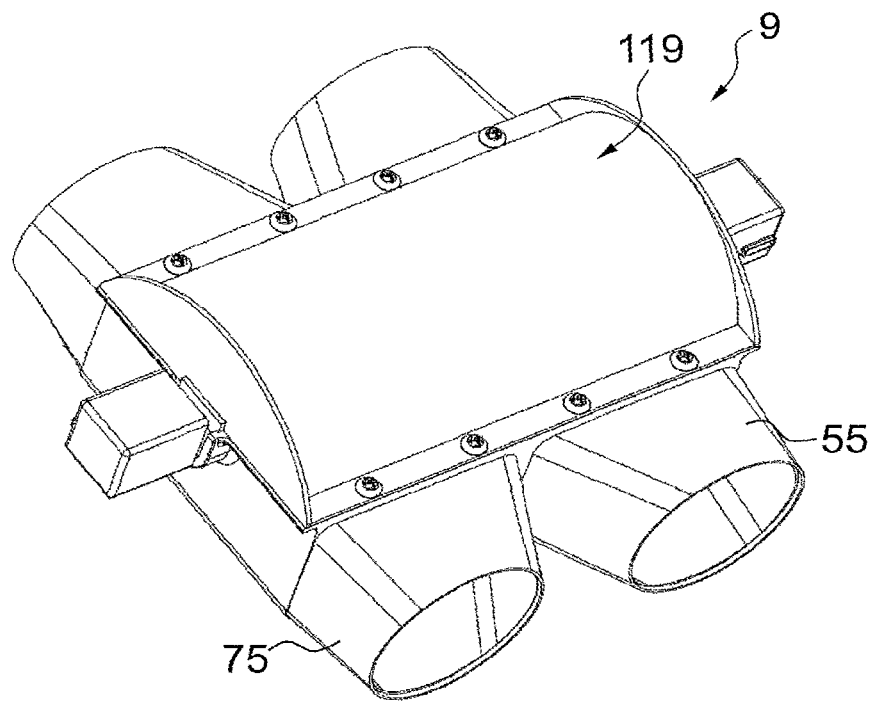
FIG. 12 shows a perspective view of the pipe junction of FIG. 10.
Figure 13:
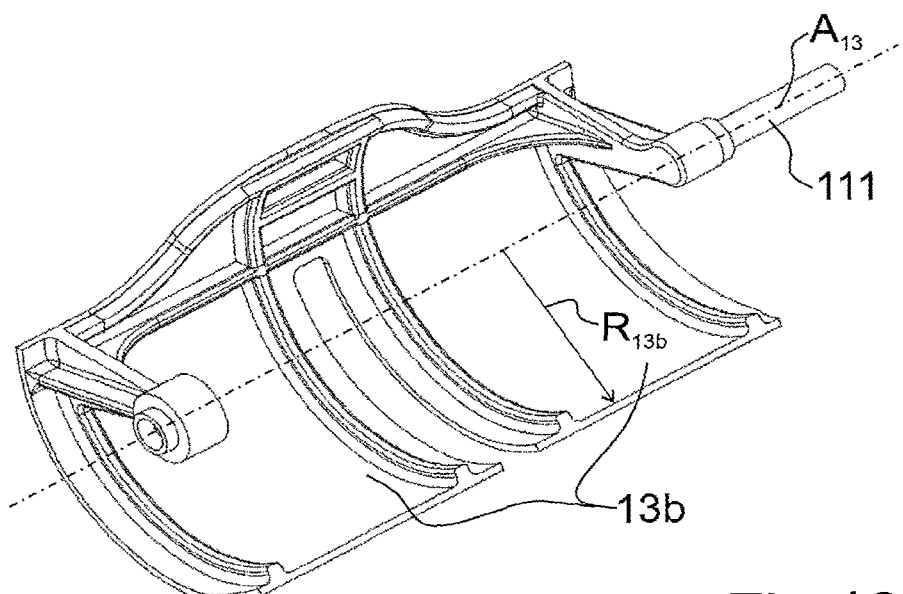
FIG. 13 is a detailed illustration of the common valve member of the pipe junction according to FIG. 10.

The junction sections 56 and 76 of the pipe junction 9 according to the embodiment shown in FIGS. 10 through 13 has an internal dividing wall 116 which realizes a separation between transit volumes 115, 117 of the left and right connection pipes 55, 75 with respect to a rest volume 118. Exhaust gas from the engine 3 can pass through the transit volumes 115, 117 of the left and right connection pipes 55, 75 as long as the common valve member 13b is at least partially open (not shown) or fully open (not shown). In order to open the common valve member 13b, it is moved into the rest volume 118 of the pipe junction 9 such that it does not inhibit the flow through the tract aperture between the left junction section 56 and the left outlet section 55 and between the right junction section 76 and the right outlet section 75b. The second valve member 13b is called common valve member because its flap, which is shown in detail in FIG. 13, is shaped such that it constricts the tract apertures essentially identically in the left tract section 5 as well as the right tract section 7. Flap sections of the common valve member 13b are shaped essentially like a shovel or a section of a cylinder surface and connected to each other and to the shaft 101 to be rotatable around the axis $A_{13}$. The rotation around the axis $A_{13}$ can move the common valve members 13b from a fully closed position in which it fully closes the above-mentioned tract aperture, such as shown in FIGS. 10 and 11, to a fully opened position, in which the common valve member 13b is essentially completely received within the rest volume 118 such that it does not constrict the tract aperture.

The central valve member 93b has an essentially semicircular shape, wherein the area covered by the central valve member 93b is greater than the area of an ideal semicircle, preferably no more than 150% of the area of the semicircle, more preferably less than 125% of the area of an ideal semicircle. As shown in FIG. 10, the central valve member 93b can be arranged in a closed state in which it separates the left transit volume 115 from the right transit volume 117 and thus separate the left connection pipe 55 effectively from the right connection pipe 75 so that exhaust gas cannot flow from the left tract 5 to the right tract 7, or vice versa. In order to provide a fluidal connection between the left exhaust tract 5 and the right exhaust tract 7, the central valve 93b can be rotated around its axis $A_{13}$ such that the valve member 93b is moved into the rest volume 118 (not shown).

The pipe junction according to the embodiment in FIGS. 10 through 13 comprises a lid 119 which seals the rest volume 118 from the atmosphere. Although the central valve member 93b and the common valve member 13b sealingly engage the dividing wall 116 on the one hand and the casing of the pipe junction 9 on the other hand, it shall be clear that a small gap may be present between the movable common valve member 13b and/or the central valve member 93b and/or both the casing of the pipe junction 9 as well as the dividing wall 116 to allow for a thermal expansion and in order to decrease wear between the movable and the stationary components. Obviously, exhaust gas can pass through the gaps and small amounts (which do not influence the flow within the pipe junction 9 from the engine 3 to the exhaust openings 53, 73) should nevertheless not exit into the atmosphere in an uncontrolled manner at the pipe junction 9.

An exhaust system 1 according to the preferred embodiments shown in FIGS. 1 and 1a can be used according to the following settings: According to a first setting, which may be called a rough sport setting, the exhaust gas from the left group of cylinders 45 is allowed to travel exclusively through the left exhaust tract 5 to both left exhaust openings 53a and 53b and the exhaust gas from the right group of cylinders 47 is allowed to travel exclusively through the right exhaust tract 7 to the right exhaust main opening 73a and the right bypass opening 73b. This first setting in conjunction with a V8-engine enables a sporty and rough high-pitched V8-sound. This first setting is achieved by particularly fully closing the common connection aperture 91 and by particularly fully closing the right exhaust tract aperture of the right valve device 13, 72 and particularly fully opening the left exhaust tract aperture of the left valve device 13, 52. The high-pitched sound is achieved due to the separation of the exhaust gas of the left and the right tract due to the firing order of the cylinder. A typical firing order of the V8-engine is "L, L, R, R, L, R, L, R", wherein L relates to the firing of a cylinder of the left group 35 and wherein R relates to the firing of a cylinder of the right group 37. If the left exhaust tract 5 and the right exhaust tract 7 are separated from one another, the gas streams in the tracts do not interfere with one another which also lead to the high-pitched sound. This first setting is particularly beneficial for the performance in a low rpm-range, particularly at less than 3,000 rotations per minute, preferably less than 2,000 rpm, due to the fact the tract pipe volume is overdimensioned for low rpm and low exhaust gas flow. In a low rpm range, only little space for expansion of the gas in the pipe junction 9 is required.

The first setting can be realized for example with the pipe junction 9 as shown in FIG. 3 or as shown in FIG. 5b or with the pipe junction of the embodiment of FIG. 10 with the closed central valve member 93b and a fully open common valve member 13b (not shown).

A second setting which may be described as a balanced sport setting can be applied, in which exhaust gas from either one of the left or right cylinder groups 35, 37 can be transferred through the left and the right exhaust tract 5, 7 to any one of the exhaust openings 53, 73. In this way, a refined balanced but a sporty loud sound output can be achieved. For this setting, the common connection aperture 91 is open to allow for exhaust gas to be transferred between the left exhaust tract 5 and the right exhaust tract 7. Furthermore, the valve devices 13, 52, 72 in the valve tracts 5, 7 are open. This setting is particularly advantageous for the medium to high rpm-range in order to improve engine performance by decreasing backpressure in the pipes of the exhaust tracts. Particularly in a high rpm-range greater than 3,000 rpm, preferably greater than 4,000 rpm. The two immediately successive pressure pulses "L, L" or "R, R" of the same, the left or the right cylinder group 35 or 37, create two pressure pulses in the same tract inlet 51 or 71 which results in a higher pressure pulse amplitude and a longer duration of the pressure pulse since the pressure pulses interfere with one another. The connection of the left and right exhaust tract 5, 7 in this case doubles the available pipe volume which allows for an improved pressure expansion and decreased back pressure. The second setting can be achieved with a pipe junction 9 as shown for example in FIGS. 2, 5*a* or with a fully open common valve member 13*b* and fully open central valve member 93*b* of the pipe junction 9 according to FIGS. 10 through 13.

In particular two phenomena occur in the pipe junction at the second setting which improve gas flow and pressure and engine performance: The first effect is called pressure pulse effect and its reflection. Due to expansion of the exhaust gas, which is allowed to flow from the tract inlet of one single of the exhaust tracts 5, 7 into both the left and the right removal pipe 59 and 79, a positive pressure pulse coming from one inlet tract 51, 71 is partially inverted into a negative pressure pulse going backwards (or upstream) towards the engine in the respective other inlet tract 71 or 51. This reflected negative pressure pulse hits a successive 90° delayed positive pressure pulse in the last mentioned "other" tract inlet 71 or 51 which helps to scavenge the exhaust gas in the last mentioned tract inlet 71 or 51. In this way, pumping losses in the exhaust system are reduced which positively effects the engine performance particularly in a medium rpm-range (for instance between 2,000 and 4,000 rpm). This effect may be called the push-pull-effect. The second effect may be called "gas stream effect". Under high operation parameters (full load, high rpm-range), the exhaust gas coming from a first inlet tract are divided at the pipe junction 9 because a relatively pressure at the exit of the respective other tract (injector effect). Performance gains of about 1% to 2% of total power increase can thus be caused.

In a third exhaust system setting, which may be called smooth setting or silent setting, exhaust gas is allowed to be transferred between the exhaust tracts 5, 7 but is forced to flow through relatively small diameter bypass lines 57, 77 in order to exit exclusively through the bypass openings 53*b*, 73*b*.

For the smooth setting, the common pipe aperture 91 is opened, but the valve devices 13, 52 and 72 are activated to allow gas to only flow through bypass lines 57, 77 to the bypass exhaust openings 53*b*, 73*b*. This silent setting can for example be achieved with a pipe junction setting as shown in FIGS. 2, 5*a* or a fully open common valve member 13*b* and a fully open central valve member 93*b* of the pipe junction 9 as shown in FIGS. 10 through 13, in an exhaust system 1 as shown in FIG. 1 in which the bypass activation valves 13 are arranged downstream from the pipe junction 9.

In a fourth setting, both the common connection aperture 91 as well as the tract apertures of the valve devices 13, 52, 72 are fully closed. Although this does not improve performance, it may reduce sound emission.

In a fifth setting, the exhaust gas is allowed to be transferred between the left exhaust tract 5 and the right exhaust tract 7, but a tract aperture in at least one of the valve devices 13 is at least partially closed and impairs the free flow of exhaust gas through a respective main exhaust opening 53*a* and/or 73*a*. This can for example be realized according to the embodiment shown in FIG. 7 or with a fully opened central valve member 93*b* and a partially opened common valve member 13*b* in the embodiment of the pipe junction 9 of the embodiment of FIG. 10 (not shown) with an exhaust system according to FIG. 1*a*.

In a sixth setting, the exhaust gas can be transferred between the left exhaust tract 5 and the right exhaust tract 7 but can exit the exhaust system 1 exclusively through the left exhaust opening or openings 53 or through the right exhaust opening or openings 73. This setting can be achieved with the embodiment as shown in FIG. 9 in an exhaust system having a pipe junction 9 such as shown for instance in FIG. 2 or in FIG. 10, the sixth setting can only be achieved in case a further valve is provided at least in one of the left or right bypass lines 57, 77 (not shown).

The fifth and sixth setting can preferably be used in modern high performance engines, particularly V6- and V8-engines, which allow for the disengagement of some of the engine's cylinders, for example the left row of cylinders 35 or the right row of cylinders 37. The exhaust system is usually dimensioned in order to minimize the backpressure at full load operation which can cause uncomfortable booming sounds and/or undesirable engine noises at the so-called partial throttle operation or cylinder disengagement move. The fifth or sixth setting can decrease these undesirable effects.

In general, if there is a fluid communication between the tracts, the left tract 5 and the right tract 7, the sound of the basic firing order frequency of half of the engine (one row of cylinders) is emphasized. An open connection between the tracts 5, 7 emphasizes the basic firing order frequency of the complete engine (both rows of cylinders). In case of an even number of cylinders, the latter is approximately two times higher than that of the former. Firing order and frequency, which are the most dominant factors in the exhaust sound of an exhaust system, influence also its higher harmonic orders. By opening or closing a common connection aperture 91, the sound emitted from the exhaust system can be significantly changed and thus two distinctive settings with different sound character can be achieved.

Figure 14:
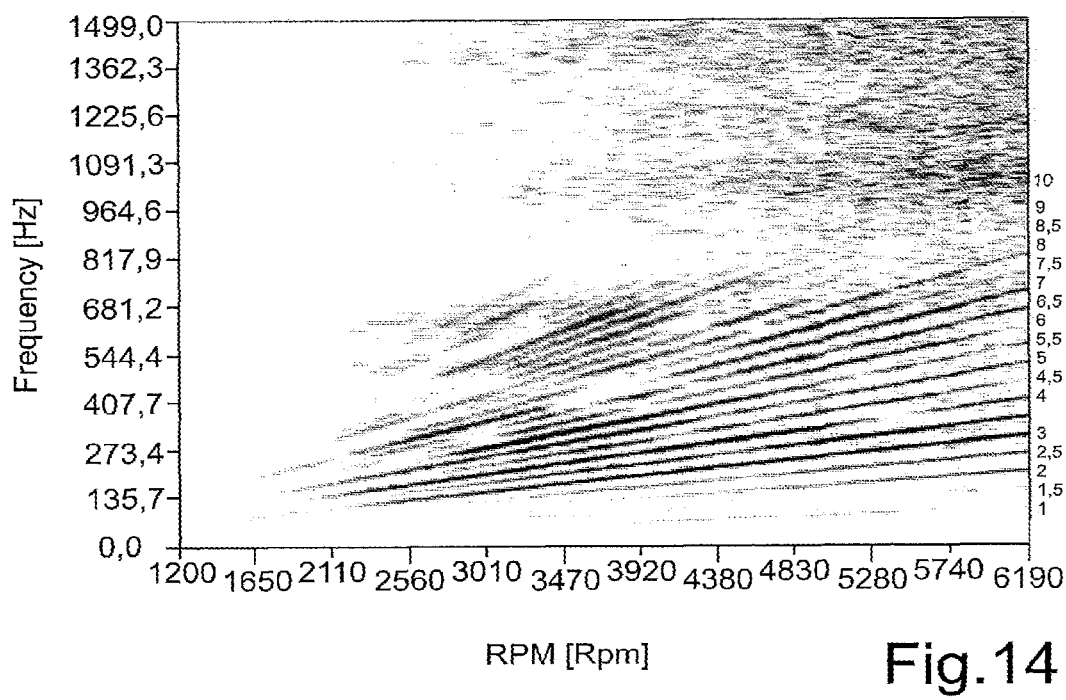
FIG. 14 a sound map showing the exhaust system's sound emission in one specific setting.
Figure 15:
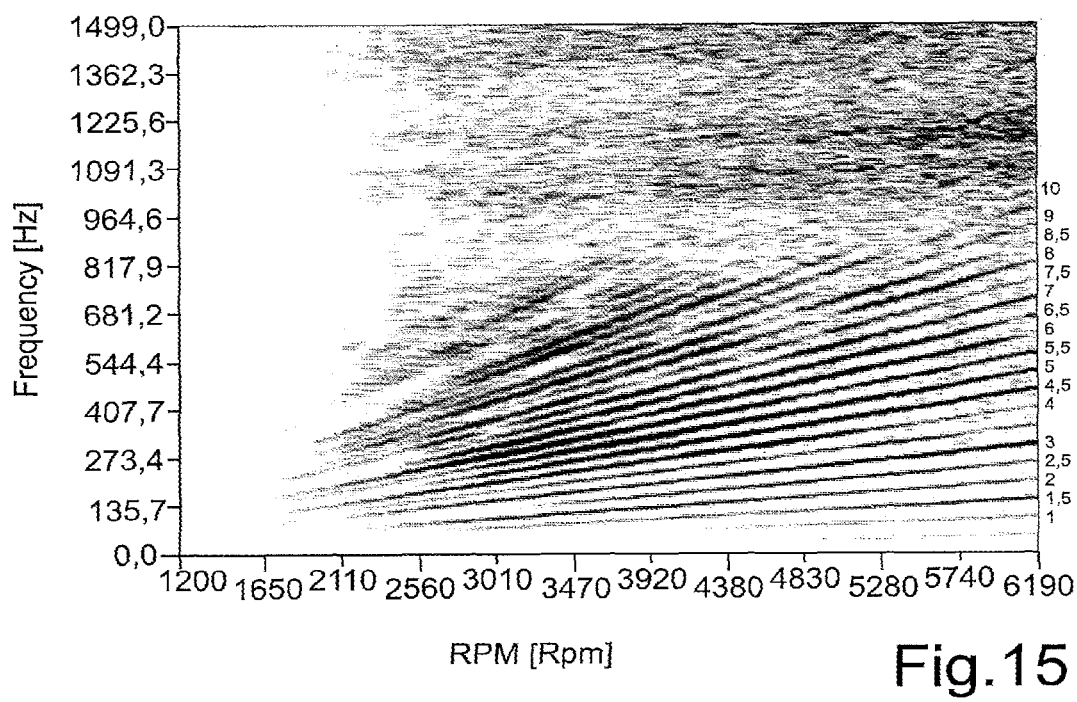
FIG. 15 a second sound map showing the exhaust system's sound emission in another specific setting.

The sound maps according to FIGS. 14 and 15 show the noise level (dBA) emitted by the exhaust system, wherein noise levels above approximately 85 dBA are indicated in black and noise levels below approximately 85 dBA are indicated in white. As described above, an exhaust system according to the invention enables the selection of two distinctive sound characters, which will be described in further detail below. Exhaust sound measurements can be performed on a vehicle by using measuring equipment that detects the rotations per minute of the engine and a signal from a microphone placed near the exhaust outlets. The so-called order tracking process can be used to extract the signal in order to be analyzed in a frequency domain (FFT) for all possible rpm-settings of the engine. Rpm-dependent sound spectra can then be combined into a matrix, such as shown in FIGS. 14 and 15.

The sound maps according to FIGS. 14 and 15 represent the frequency and volume characteristics of the sound in one graph dependent upon the rpm-setting of the engine. Since an internal combustion engine provides a proportional or linear output with respect to its revolution speed, the orders or harmonics of the sound emission are represented as linear lines in the sound color map, for the sound emissions of 85 dBA and above. The sound measurements shown in FIGS. 14 and 15 were performed with a V8 biturbo engine connected to an exhaust system according to the invention.

FIG. 14 shows a sound map for an opened connection between the main left and right exhaust tract. FIG. 15 shows a sound map for an exhaust system according to the invention in which the connection between the left tract and the right tract (the common connection aperture) is closed.

Referring to FIG. 14, the most dominant harmonic orders are 3.0 and 3.5 throughout the entire rpm-range of the V8 biturbo engine. In the medium rpm-range of the V8 biturbo engine, the harmonic orders of 4.0, 4.5 and 5.0 are also dominant. Higher orders (6 to 10) are present but far less intensive. Low frequency sounds of the 1.5 and 2.0 order are not present.

In the sound map of FIG. 15, which relates to the closed connection between the tracts, the sound emission is visibly different. In particular, the opened connection between the left exhaust tract and the right exhaust tract allows for lower harmonic orders to also be audible, namely the 1.5 and 2.0 order. Further, in difference to the closed arrangement described above, a wide spectrum from orders 4 to 10 including all half orders in this range are also present, which define a strong wide band sound. Specifically in the rpm-range between 4,000 and 6,200 rpm, this wide band is much more intensive in comparison to the closed connection sound map of FIG. 14.

The differences of the acoustic emission shown in FIGS. 14 and 15 are well detected by a human ear. The sound presented in FIG. 14 is less intensive, smoother, and refined. The sound according to FIG. 15 is more aggressive, has a higher pitch and emphasizes the basic character of the engine.

If the complete number of engine cylinders is N (for example 8, such as shown in FIG. 1) and the engine type is a four-stroke-type, each engine cylinder bank or group has N/2 cylinders (four cylinders in both the left row 35 as well as the right row 37 of the engine 3 shown in FIG. 1), so that the basic firing sound order frequency in case the left tract 5 and the right tract 7 are connected can be calculated with the following equation, where f is the engine's speed in revolutions per second: $FO_{con}=N \cdot f/2$;

As the engine speed is variable from ideal to the maximum rpm, each firing order has a range from a minimum to a maximum frequency. In case the connection between the tracts 5, 7 is fully closed, the basic equation for the firing sound or order frequency is: $FO_{discon}=N \cdot f/4$.

Firing order frequency can be slightly shifted because of the engine layout (the angle between the cylinder head and the crank case layout). However, the sound domination is being maintained between both operating states.

The features disclosed in the above description, the figures and the claims may be significant for the realisation of the invention in its different embodiments individually as in any combination.

REFERENCE NUMERALS 1 exhaust system
3 internal combustion automotive engine
5 left exhaust tract
7 right exhaust tract
9 pipe junction
11 control unit
13 valve device
14 rear muffler
35 left group of cylinders
37 right group of cylinders
51, 71 tract inlet
52, 72 valve device
53, 73 exhaust outlet
53a, 73a main exhaust outlet
53a, 73b bypass exhaust outlet
50, 72, 58a, 58b, 54, exhaust gas
74, 78a, 78b, 60, 80 exhaust gas
55, 75 connection pipe
55a, 75a inlet section
55b, 75b outlet section
55i, 75i, inlet opening
55o, 75o outlet opening
57, 77 bypass line
59, 79 removal pipe
56, 76 junction section
90 common valve device
91 common connection aperture
93, 95, 97 valve member
94 bypass aperture
96 upper rotation plate
98 lower rotation plate
99 electronic motor
101, 111 shaft
103 bearing
105, 107 gear box
109, 116 wall
115, 117 transit volume
118 rest volume
119 lid
A axis of rotation
R radial extension
α circumferential extension of the wall
β circumferential extension of the common connection aperture
χ0 circumferential dimension of outlet section
χ1 circumferential dimension of inlet section

The invention claimed is:

1. An exhaust system for an internal combustion automotive engine, the exhaust system comprising:
a left exhaust tract connectable to a left group of cylinders of the internal combustion automotive engine;
a right exhaust tract connectable to a right group of cylinders of the internal combustion automotive engine;
each exhaust tract comprising a tract structure defining:
a tract inlet for receiving exhaust gas ejected from the group of cylinders to which the exhaust tract is connectable, and
an main exhaust outlet and a bypass exhaust outlet opening into the atmosphere;
each exhaust tract further comprising:
a valve device for opening and/or closing a tract aperture arranged between the tract inlet and one of the main exhaust outlet and the bypass exhaust outlet, such that, in the opened state of the valve device, exhaust gas is transferable from the tract inlet to the main exhaust outlet and the bypass exhaust outlet, and such that, in the closed state of the valve device, exhaust gas is prevented from flowing from the tract inlet to the main exhaust outlet, and
a connection pipe extending between the tract inlet and the main exhaust outlet, including an inlet aperture for receiving exhaust gas from the tract inlet and an outlet aperture for transferring exhaust gas towards the main exhaust outlet, wherein a connection aperture of the left connection pipe and a connection aperture of the right connection pipe are immediately joined to realize a pipe junction such that the left and right connection pipes form a common connection aperture for transferring exhaust gas between the left exhaust tract and the right exhaust tract without dead volume between the left exhaust tract and the right exhaust tract; and
at least one valve member for opening and/or closing the common connection aperture.

2. The exhaust system according to claim 1, wherein:
the connection pipes are angled and/or curved such that the pipe junction is X-shaped, the pipe junction realizes the only connection for transferring exhaust gas between the exhaust tracts, or the common connection aperture defines a mixing area which is between 0.25 and 4.0 times as large as a reference area defined by the cross sectional area of the left and/or right exhaust tract.

3. The exhaust system according to claim 1, wherein:

the at least one valve member includes a closure member for covering at least 50% of a mixing area defined by the common connection aperture, the closure member comprises a bypass aperture, and the closure member can be rotated to switch between a fully opened and a closed state.

4. The exhaust system according to claim 1, wherein each exhaust tract further comprises a bypass pipe leading to a second exhaust outlet opening into the atmosphere, and wherein the bypass pipe is branched off upstream from the valve device.

5. The exhaust system according to claim 4, wherein:

the valve device is included in the pipe junction, the pipe junction includes a first valve member and a second valve member, and the first and second valve members are movable independently from one another.

6. The exhaust system according to claim 5, wherein the first valve member is a left valve member movable for selectively opening the common connection aperture and/or the left exhaust tract aperture, and the second valve member is a right valve member movable for selectively opening the common connection aperture and/or the right exhaust tract aperture.

7. The exhaust system according to claim 5, wherein the first valve member is realized by a central valve member for selectively opening or closing the common connection aperture, and the second valve member is realized by a common valve member for opening or closing both tract apertures.

8. The exhaust system according to claim 1, wherein the cross sectional area of the main exhaust outlets is larger than the cross sectional area of the bypass exhaust outlets.

9. The exhaust system according to claim 1, wherein the valve device is arranged in the respective left or right exhaust tract downstream with respect to the common connection aperture.

10. The exhaust system according to claim 1, wherein:

each exhaust tract further comprises a bypass line for transferring exhaust gas from the tract inlet to one of the main exhaust outlet and the bypass exhaust outlet, and the bypass line is split off from the main piping of the respective exhaust tract, wherein the main piping includes the respective tract inlet and at least one other of the main exhaust outlet and the bypass exhaust outlet either upstream or downstream of the connection.

11. The exhaust system according to claim 1, further comprising a controller for controlling the valve member to open or to close the connection or common connection aperture depending upon an engine operation condition and/or depending upon a manual setting.

12. The exhaust system according to claim 1, further comprising a controller adapted to control the valve member and the valve device according to at least one of the following settings:

a. common connection aperture closed and right and left exhaust tract aperture opened;

b. common connection aperture opened and right and left exhaust tract aperture opened; and c. common connection aperture opened and right and left exhaust tract aperture fully closed.

13. The exhaust system according to claim 12, wherein the controller is adapted to control the valve member and the valve device according to at least one further of the following settings:

a. common connection aperture closed and right and left exhaust tract aperture fully closed;

b. common connection aperture opened and right and/or exhaust tract aperture partially closed; and c. common connection aperture opened and one exhaust tract aperture opened, the other exhaust tract aperture fully closed.

14. The exhaust system according to claim 1, further comprising a controller adapted to control the valve member and the valve device according to the following settings:

a. common connection aperture closed and right and left exhaust tract aperture opened;

b. common connection aperture opened and right and left exhaust tract aperture opened; and c. common connection aperture opened and right and left exhaust tract aperture fully closed.

15. The exhaust system according to claim 14, wherein the controller is adapted to control the valve member and the valve device according to further of the following settings:

a. common connection aperture closed and right and left exhaust tract aperture fully closed;

b. common connection aperture opened and right and/or exhaust tract aperture partially closed; and c. common connection aperture opened and one exhaust tract aperture opened, the other exhaust tract aperture fully closed.

16. An exhaust system for an internal combustion automotive engine, the exhaust system comprising:

a left exhaust tract connectable to a left group of cylinders of the internal combustion automotive engine;

a right exhaust tract connectable to a right group of cylinders of the internal combustion automotive engine;

each exhaust tract comprising a tract structure defining:

a tract inlet for receiving exhaust gas ejected from the group of cylinders to which the exhaust tract is connectable, and a main exhaust outlet and a bypass exhaust outlet opening into the atmosphere;

each exhaust tract further comprising:

a valve device for opening and/or closing a tract aperture arranged between the tract inlet and one of the main exhaust outlet and the bypass exhaust outlet, such that, in the opened state of the valve device, exhaust gas is transferable from the tract inlet to the main exhaust outlet and the bypass exhaust outlet, and such that, in the closed state of the valve device, exhaust gas is prevented from flowing from the tract inlet to the main exhaust outlet, and a connection pipe extending between the tract inlet and the main exhaust outlet, including an inlet aperture for receiving exhaust gas from the tract inlet and an outlet aperture for transferring exhaust gas towards the exhaust outlet, wherein the left connection pipe and the right connection pipe are joined to realize a pipe junction such that the left and right connection pipes form a common connection aperture for transferring exhaust gas between the tracts; and at least one valve member for opening and/or closing the common connection aperture, wherein the connection pipes are angled and/or curved such that the pipe junction is X-shaped,
wherein the common connection aperture defines a mixing area which is between 0.75 and 1.50 times as large as a reference area, and
wherein the reference area is defined by the cross-sectional area of the left or right connection pipe at a respective inlet aperture or outlet aperture thereof.

17. The exhaust system according to claim 16, wherein the mixing area is between 90% and 110% of the size of the reference area or wherein the mixing area and the reference area are of the same size.

\* \* \* \* \*